United States Patent
Tang

(10) Patent No.: US 12,470,704 B2
(45) Date of Patent: Nov. 11, 2025

(54) PICTURE PROCESSING METHOD AND VIDEO DECODER

(71) Applicant: GUANGDONG OPPO MOBILE TELECOMMUNICATIONS CORP., LTD., Guangdong (CN)

(72) Inventor: Tong Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 274 days.

(21) Appl. No.: 18/323,355

(22) Filed: May 24, 2023

(65) Prior Publication Data

US 2023/0300329 A1    Sep. 21, 2023

Related U.S. Application Data

(63) Continuation of application No. PCT/CN2020/133427, filed on Dec. 2, 2020.

(51) Int. Cl.
| | |
|---|---|
| *H04N 19/117* | (2014.01) |
| *H04N 19/105* | (2014.01) |
| *H04N 19/176* | (2014.01) |
| *H04N 19/80* | (2014.01) |

(52) U.S. Cl.
CPC ......... *H04N 19/117* (2014.11); *H04N 19/105* (2014.11); *H04N 19/176* (2014.11); *H04N 19/80* (2014.11)

(58) Field of Classification Search
CPC .. H04N 19/117; H04N 19/105; H04N 19/176; H04N 19/80
See application file for complete search history.

(56) References Cited

U.S. PATENT DOCUMENTS

| | | | |
|---|---|---|---|
| 2003/0053711 A1 | 3/2003 | Kim | |
| 2019/0273929 A1* | 9/2019 | Ma | ........................ H04N 19/176 |

FOREIGN PATENT DOCUMENTS

| | | |
|---|---|---|
| CN | 1492686 | 4/2004 |
| CN | 1694537 | 11/2005 |
| CN | 102098516 | 6/2011 |
| CN | 104113765 | 10/2014 |

OTHER PUBLICATIONS

Bross et al., "Versatile Video Coding (Draft 9)," Joint Video Experts Team (JVET) of ITU-T SG 16 WP 3 and ISO/IEC JTC 1/SC 29/WG 11, JVET-R2001-vB, Apr. 2020.
Chen, "Research on deblocking effect algorithm based on video codec standard," Paper Submitted for Xidian University, Jan. 2007.
Ikeda et al., "CE11: Long-tap deblocking filter for luma and chroma (CE11.1.6)," Joint Video Experts Team (JVET) of ITU-T SG 16 WP 3 and ISO/IEC JTC 1/SC 29/WG 11, JVET-L0327-v1, Oct. 2018.
WIPO, International Search Report and Written Opinion for International Application No. PCT/CN2020/133427, Sep. 1, 2021.

* cited by examiner

*Primary Examiner* — On S Mung
(74) *Attorney, Agent, or Firm* — Hodgson Russ LLP

(57) ABSTRACT

A picture processing method and a video decoder are provided in the disclosure. In this disclosure, a joint asymptotic feature of a boundary to-be-filtered is determined according to sample values of samples at two sides of the boundary to-be-filtered. The joint asymptotic feature can truly reflect whether the boundary to-be-filtered is a real boundary. Whether to filter the boundary to-be-filtered is determined according to the joint asymptotic feature.

16 Claims, 11 Drawing Sheets

CROSS-REFERENCE TO RELATED APPLICATION(S)

This application is a continuation of International Application No. PCT/CN2020/133427, filed Dec. 2, 2020, the entire disclosure of which is hereby incorporated by reference.

TECHNICAL FIELD

This disclosure relates to the field of picture processing, and in particular to picture processing methods and a video decoder.

BACKGROUND

Since current coding techniques are block-based coding in which prediction, transformation and quantization of different blocks are independent of each other, the magnitude and distribution of errors introduced from quantization are also independent of each other, resulting in a visual blocking effect due to discontinuous coding boundaries. In order to solve this problem, it is necessary to perform deblocking filtering (DBF) on block boundaries, i.e., perform smooth filtering on the block boundaries to reduce or remove the blocking effect.

To prevent over-filtering of a real boundary, it is necessary to determine whether to filter the block boundary before performing the DBF.

Existing methods of determining whether to filter the block boundary may cause the problem of over-filtering.

SUMMARY

In a first aspect, a picture processing method is provided. The method is applied to a video encoder and includes the following. A partial or complete reconstructed picture of a picture to-be-encoded is obtained, where the partial or complete reconstructed picture contains one or more reconstructed picture blocks. A boundary to-be-filtered of the reconstructed picture block is determined. A boundary filtering strength of the boundary to-be-filtered is determined according to encoding information of a first picture block and a second picture block which are adjacent to the boundary to-be-filtered on two sides of the boundary to-be-filtered respectively. When the boundary filtering strength of the boundary to-be-filtered is greater than a first preset value, a joint asymptotic feature of the boundary to-be-filtered is determined according to sample values of samples at two sides of the boundary to-be-filtered. Whether to filter the boundary to-be-filtered is determined according to the joint asymptotic feature of the boundary to-be-filtered.

In a second aspect, a picture processing method is provided. The method is applied to a video decoder and includes the following. A bitstream is parsed to determine a partial or complete reconstructed picture, where the partial or complete reconstructed picture contains one or more reconstructed picture blocks. A boundary to-be-filtered of the reconstructed picture block is determined. A boundary filtering strength of the boundary to-be-filtered is determined according to encoding information of a first picture block and a second picture block which are adjacent to the boundary to-be-filtered on two sides of the boundary to-be-filtered respectively. When the boundary filtering strength of the boundary to-be-filtered is greater than a first preset value, a joint asymptotic feature of the boundary to-be-filtered is determined according to sample values of samples at two sides of the boundary to-be-filtered. Whether to filter the boundary to-be-filtered is determined according to the joint asymptotic feature of the boundary to-be-filtered.

In a third aspect, a video decoder is provided, which includes a processor and a memory. The memory is configured to store a computer program. The processor is configured to invoke and run the computer program stored in the memory to execute the method of the second aspect or implementations thereof.

DETAILED DESCRIPTION

The disclosure can be applied to the field of picture coding, video coding, hardware video coding, dedicated circuit video coding, real-time video coding, etc. For example, the solution in the disclosure may be incorporated into the Audio Video Coding Standard (AVS), such as H.264/audio video coding (AVC) standard, H.265/high efficiency video coding (HEVC) standard, and H.266/versatile video coding (VVC) standard. Alternatively, the solution in the disclosure may incorporated into other proprietary or industry standards, including ITU-TH.261, ISO/IECMPEG-1Visual, ITU-TH.262 or ISO/IECMPEG-2Visual, ITU-TH.263, ISO/IECMPEG-4Visual, ITU-TH.264 (also known as ISO/IECMPEG-4AVC), including scalable video coding (SVC) and multi-view video coding (MVC) extensions. It should be understood that the techniques in the disclosure are not limited to any particular coding standard or technology.

Figure 1:
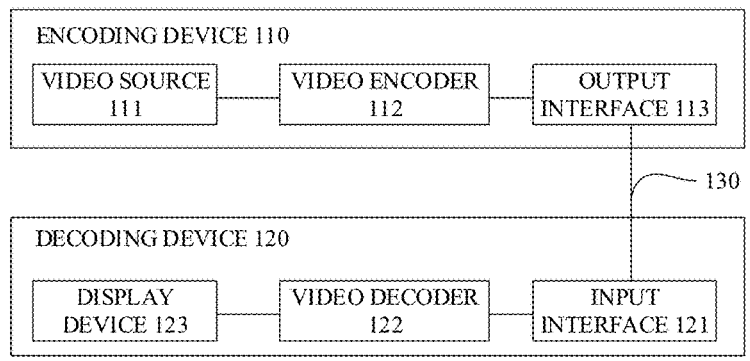
FIG. 1 is a schematic block diagram of a video coding system 100 involved in implementations of the disclosure.

For ease of understanding, a video coding system in implementations of the disclosure is first introduced with reference to FIG. 1.

FIG. 1 is a schematic block diagram of a video coding system 100 according to implementations of the disclosure. As illustrated in FIG. 1, the video coding system 100 includes an encoding device 110 and a decoding device 120. The encoding device is configured to encode (which can be understood as compress) video data to generate a bitstream, and transmit the bitstream to the decoding device. The decoding device decodes the bitstream generated by the encoding device to obtain the video data.

The encoding device and the decoding device may contain one or more processors and one or more memories. The memory may include, but is not limited to, RAM, ROM, EEPROM, flash memory, or any other medium that can be used to store desired program codes in the form of instructions or data structures that can be accessed by the computer.

The encoding device 110 in the implementations of the present disclosure can be understood as a device with a video encoding function, and the decoding device 120 can be understood as a device with a video decoding function, that is, the encoding device 110 and the decoding device 120 in the implementations of the present disclosure include a wider range of devices, including smartphones, desktop computers, mobile computing devices, notebook (such as laptop) computers, tablet computers, set-top boxes, televisions, cameras, display devices, digital media players, video game consoles, vehicle-mounted computers, and the like.

In some implementations, the encoding device 110 may transmit encoded video data (such as bitstream) to the decoding device 120 via a channel 130. The channel 130 may include one or more media and/or apparatuses capable of transferring the encoded video data from the encoding device 110 to the decoding device 120.

In an example, the channel 130 includes one or more communication media that enable the encoding device 110 to transmit the encoded video data directly to the decoding device 120 in real-time. In this example, the encoding device 110 may modulate the encoded video data according to a communication standard and transmit the modulated video data to the decoding device 120. The communication medium includes a wireless communication medium, such as a radio frequency spectrum. Optionally, the communication medium may also include a wired communication medium, such as one or more physical transmission lines.

In another example, the channel 130 includes a storage medium that can store video data encoded by the encoding device 110. The storage medium includes a variety of local access data storage media, such as optical discs, DVDs, flash memory, and the like. In this example, the decoding device 120 may obtain encoded video data from the storage medium.

In another example, the channel 130 may include a storage server that may store video data encoded by the encoding device 110. In this example, the decoding device 120 may download the stored encoded video data from the storage server. Optionally, the storage server may store the encoded video data and may transmit the encoded video data to the decoding device 120. For example, the storage server may be a web server (e.g., for a website), a file transfer protocol (FTP) server, and the like.

In some implementations, the encoding device 110 includes a video encoder 112 and an output interface 113. The output interface 113 may include a modulator/demodulator (modem) and/or a transmitter.

In some implementations, the encoding device 110 may include a video source 111 in addition to the video encoder 112 and the input interface 113.

The video source 111 may include at least one of a video capture apparatus (for example, a video camera), a video archive, a video input interface, or a computer graphics system, where the video input interface is configured to receive video data from a video content provider, and the computer graphics system is configured to generate video data.

The video encoder 112 encodes the video data from the video source 111 to generate a bitstream. The video data may include one or more pictures or a sequence of pictures. The bitstream contains encoding information of the picture or sequence of pictures in the form of bitstream. The encoding information may include encoded picture data and associated data. The associated data may include a sequence parameter set (SPS), a picture parameter set (PPS), and other syntax structures. The SPS may contain parameters applied to zero or more sequences. The PPS may contain parameters applied to zero or more pictures. The syntax structure refers to a set of zero or multiple syntax elements arranged in a specified order in the bitstream.

The video encoder 112 may partition the picture into a grid of coding tree blocks (CTBs). In some examples, a CTB may be called a "tree block", a "largest coding unit" (LCU), or a "coding tree unit". A CTB may include one or more coding units (CUs). Each CTB may be associated with a pixel block of equal size within the picture. Each pixel may correspond to one luminance (luma) sample and two chrominance (chroma) samples. Thus, each CTB may be associated with one luma sample block and two chroma sample blocks. A CTB in the picture may be partitioned into one or more slices. In some examples, each slice contains an integer number of CTBs. As part of the encoding picture, the video encoder 112 may generate encoding information for each slice in the picture, i.e., encode the CTBs within the slice. Optionally, in order to encode a CTB, the video encoder 112 may perform quadtree partitioning on the pixel block associated with the CTB, so as to partition the pixel block associated with the CTB into smaller pixel blocks, where the smaller pixel block can be associated with a CU.

The video encoder 112 directly transmits the encoded video data to the decoding device 120 via the output interface 113. The encoded video data may also be stored on a storage medium or a storage server for subsequent reading by the decoding device 120.

In some implementations, the decoding device 120 includes an input interface 121 and a video decoder 122.

In some implementations, the decoding device 120 may include a display device 123 in addition to the input interface 121 and the video decoder 122.

The input interface 121 includes a receiver and/or a modem. The input interface 121 may receive encoded video data through the channel 130.

The video decoder 122 is configured to decode the encoded video data to obtain decoded video data, and transmit the decoded video data to the display device 123.

The display device 123 displays the decoded video data. The display device 123 may be integrated with the decoding device 120 or external to the decoding device 120. The display device 123 may include various display devices, such as a liquid crystal display (LCD), a plasma display, an organic light emitting diode (OLED) display, or other types of display devices.

In addition, FIG. 1 is only an example, and the technical solutions of the implementations of the present disclosure are not limited to FIG. 1. For example, the technology of the present disclosure may also be applied to video encoding or video decoding at single side.

The video encoder 112 and the video decoder 122 include one or more processors, such as one or more microprocessors, digital signal processors (DSPs), application specific integrated circuits (ASICs), field programmable gate arrays (FPGAs) or any combination thereof. If part or all of the technology of the present disclosure is implemented by software, the video encoder 112 and the video decoder 122 also include one or more memories, which are configured to store computer instructions, and one or more processors execute these instructions to realize the solutions in the disclosure.

In the following, a video encoding framework in implementations of the disclosure will be introduced.

Figure 2:
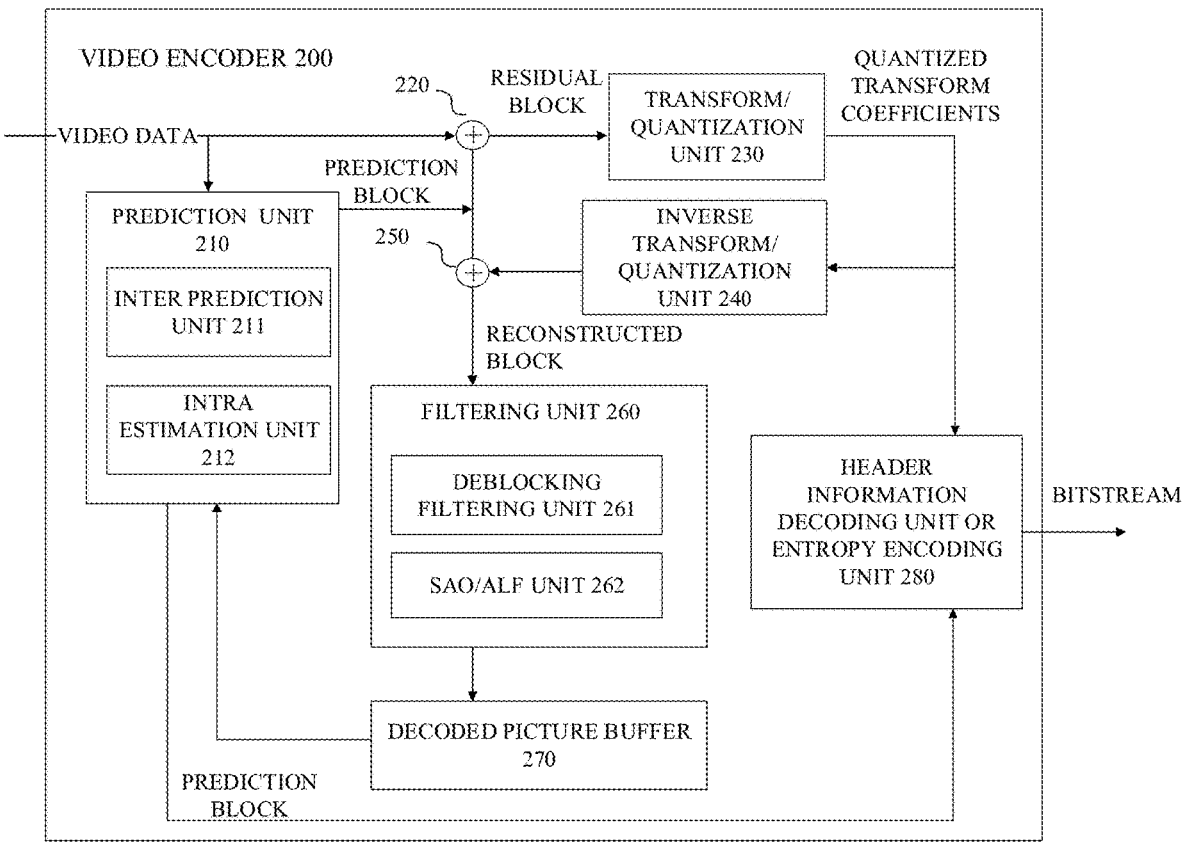
FIG. 2 is a schematic block diagram of a video encoder 200 provided in implementations of the disclosure.

FIG. 2 is a schematic block diagram of a video encoder 200 provided in implementations of the present disclosure. It should be understood that the video encoder 200 may be configured to perform lossy compression or lossless compression on a picture. The lossless compression may be visually lossless compression or mathematically lossless compression.

The video encoder 200 may be applied to picture data in luma-chroma (YCbCr, YUV) format. For example, a YUV ratio may be 4:2:0, 4:2:2 or 4:4:4, where Y represents luminance (Luma), Cb (U) represents blue chrominance, and Cr (V) represents red chrominance. U and V represent chrominance (Chroma) for describing color and saturation. For example, in terms of color format, 4:2:0 represents that every 4 pixels have 4 luma components and 2 chroma components (YYYYCbCr), 4:2:2 represents that every 4 pixels have 4 luma components and 4 chroma component (YYYYCbCrCbCr), and 4:4:4 represents full pixel display (YYYYCbCrCbCrCbCrCbCr).

For example, for digital videos in different colour forms, the video encoder 200 reads different numbers of pixels including luma components and chroma components. In other words, the video encoder 200 may read a monochrome or color picture, that is, the picture to-be-encoded. After reading the picture to-be-encoded, the video encoder 200 partitions the picture to-be-encoded into block data, and encodes based on the block data. For example, the video encoder 200 reads video data, and for each picture in the video data, partitions the picture into several coding tree units (CTU). A CTU includes one luma CTB and two chroma CTBs. The CTB has a size of 16, 32, 64, etc. The CTU may be further partitioned into several coding units (CUs) for coding. The CU may be a rectangular block or a square block. The CU may be further partitioned into a prediction unit (PU) and a transform unit (TU). In this way, coding, prediction, and transformation are separated, and thus processing is more flexible. In an example, the CTU is partitioned into CUs in a quadtree manner. For example, the CU has a maximum size of 64×64 and a minimum size of 8×8. The CU is partitioned into TUs and PUs in a quadtree manner. For example, the TU has a maximum size of 32×32 and a minimum size of 8×8. There is no definite relationship between PU and TU, allowing TU to span multiple PUs. But in intra prediction, one PU may correspond to multiple TUs, and one TU may correspond to at most one PU.

In one example, the video encoder may encode CUs according to a zigzag scan order. In other words, the video encoder may encode the CUs in an order of an upper-left CU, an upper-right CU, a lower-left CU, and then a lower-right CU. When the video encoder encodes a partitioned CU, the video encoder may encode the CUs associated with the sub-blocks of the pixel blocks of the partitioned CU according to a zigzag scan order.

In another example, a video encoder may encode CUs according to raster scan order.

The video encoder and video decoder can support various PU sizes. Assuming that a size of a specific CU is 2N×2N, the video encoder and the video decoder may support PUs of 2N×2N or N×N for intra prediction, and support symmetric PUs of 2N×2N, 2N×N, N×2N, N×N, or similar size for inter prediction. The video encoder and video decoder may also support asymmetric PUs of 2N×nU, 2N×nD, nL×2N, or nR×2N for inter prediction.

In some implementations, as illustrated in FIG. 2, the video encoder 200 may include a prediction unit 210, a residual unit 220, a transform/quantization unit 230, an inverse transform/quantization unit 240, a reconstruction unit 250, a filtering unit 260, a decoded picture buffer 270, and a header information decoding unit or an entropy encoding unit 280. It should be noted that the video encoder 200 may include more, less, or different functional components.

The prediction unit 210 may predict the picture block to-be-encoded with reference to adjacent picture blocks of the picture to-be-encoded, so as to output the prediction block. The residual unit 220 may calculate a residual block based on the prediction block and the picture block to-be-encoded, that is, a difference between the prediction block and the picture block to-be-encoded, and the residual block may also be referred to as residual information. The residual block is transformed and quantized by the transform/quantization unit 230 to remove information that is not sensitive to human eyes, so as to eliminate visual redundancy. Optionally, the residual block before being transformed and quantized by the transform/quantization unit 230 may be called a time-domain residual block, and the time-domain residual block after being transformed and quantized by the transform/quantization unit 230 may be called a frequency residual block or a frequency-domain residual block. The header information decoding unit or entropy decoding unit 280 receives the quantized transform coefficients output by the transform/quantization unit 230, and then performs entropy coding on the quantized transform coefficients to output a bitstream. For example, the header information decoding unit or entropy decoding unit 280 can eliminate character redundancy according to a target context model and probability information of the binary bitstream.

Optionally, in this disclosure, the picture block to-be-encoded may be referred to as original picture block. The prediction block may be referred to as a prediction picture block or a picture prediction block. The reconstructed picture block may be referred to as a reconstructed block or a picture reconstructed block.

In some implementations, the prediction unit 210 includes an inter prediction unit 211 and an intra estimation unit 212.

The intra estimation unit 212 predicts pixel information in the picture block to-be-coded with reference to only information of the same picture, so as to eliminate spatial redundancy. A picture used for intra prediction may be an I frame.

The inter prediction unit 211 may be used for inter prediction. The inter prediction can refer to picture information of different pictures, and search for motion vector information that is best matched with the picture block to-be-encoded using motion estimation, so as to eliminate temporal redundancy. A picture for which inter prediction is used may be a P frame and/or a B frame, where P frame refers to a forward prediction picture, and B frame refers to bidirectional prediction picture.

In intra prediction, the picture block to-be-encoded may be predicted using an angular prediction mode or a non-angular prediction mode.

Taking the international digital video coding standard H series as an example, the H.264/AVC standard involves 8 angular prediction modes and 1 non-angular prediction mode; the H.265/HEVC standard involves 33 angular prediction modes and 2 non-angular prediction modes, the H.266/VVC standard involves 67 prediction modes, including 2 non-angular prediction modes and extending the number of angular modes from 33 in H.265 to 65. It is undoubted that with the increase of the number of angular modes, the intra prediction will be more accurate and more in line with the demand for the development of high-definition and ultra-high-definition digital video.

The residual unit 220 may generate a residual block of the CU based on a pixel block of the CU and a prediction block of a PU of the CU. For example, the residual unit 220 may generate the residual block for the CU such that each sample in the residual block has a value equal to a difference between a sample in the pixel block of the CU and a corresponding sample in the prediction block of the PU of the CU.

Since a pixel in the residual block of the TU may correspond to one luma sample and two chroma samples, each TU may be associated with one luma sample block and two chroma sample blocks. The transform/quantization unit 230 may generate transform coefficients for each TU of a CU by applying one or more transformations to a residual sample block associated with the TU. For example, the transform/quantization unit 230 may apply a discrete cosine transform (DCT), a directional transform, or a conceptually similar transform to the residual block.

The transform/quantization unit 230 may quantize transform coefficients. The transform/quantization unit 230 may quantize transform coefficients associated with a TU of a CU based on a quantization parameter (QP) value associated with the CU. The video encoder 200 may adjust the degree of quantization applied to transform coefficients associated with the CU by adjusting the QP value associated with the CU.

The inverse transform/quantization unit 240 may perform inverse quantization and inverse transform respectively on the quantized transform coefficients to reconstruct a residual block from the quantized transform coefficients.

The reconstruction unit 250 may add samples in the reconstructed residual block with corresponding samples in one or more prediction blocks generated by the prediction unit 210 to generate a reconstructed picture block associated with the TU. By reconstructing sample blocks of each TU of the CU in this way, the video encoder 200 can reconstruct the pixel block of the CU.

The filtering unit 260 may perform deblocking filtering to reduce blocking effects of the pixel block associated with the CU.

In some implementations, the filtering unit 260 includes a deblocking filtering unit 261 and a sample adaptive offset/adaptive loop filtering (SAO/ALF) unit 262, where the deblocking filtering unit 261 is configured to remove blocking effects, and the SAO/ALF unit 262 is configured to remove ringing effects.

The deblocking filtering unit 261 in the implementations may be further configured to determine a boundary to-be-filtered of the reconstructed picture block, determine a boundary filtering strength of the boundary to-be-filtered according to encoding information of a first picture block and a second picture block which are adjacent to the boundary to-be-filtered on two sides of the boundary to-be-filtered respectively, determine a joint asymptotic feature of the boundary to-be-filtered according to sample values of samples at two sides of the boundary to-be-filtered when the boundary filtering strength of the boundary to-be-filtered is greater than a first preset value, and determine whether to filter the boundary to-be-filtered according to the joint asymptotic feature of the boundary to-be-filtered, where the joint asymptotic feature of the boundary to-be-filtered indicates whether the boundary to-be-filtered is a real boundary.

For example, if the boundary to-be-filtered is a vertical boundary, the first picture block and the second picture block form a first boundary area containing N rows of samples. In this case the deblocking filtering unit 261 determines an i-th row parameter according to a difference between a sample value of a distal sample and a sample value of a center sample in an i-th row of samples in the first boundary area, where i is an integer greater than or equal to 1 and less than N. The deblocking filtering unit 261 then determines at least one of the first to N-th row parameters as the joint asymptotic feature of the boundary to-be-filtered, and determines whether to filter the boundary to-be-filtered according to the joint asymptotic feature of the boundary to-be-filtered. For example, determine not to filter the boundary to-be-filtered when the at least two parameters of the first to N-th row parameters each are greater than or equal to a second preset value.

Since the joint asymptotic feature can truly reflect whether the boundary to-be-filtered is a real boundary, by determining whether to filter the boundary to-be-filtered based on the joint asymptotic feature, the accuracy of determining whether to filter can be improved, thus preventing the video encoder 200 from over-filtering of the real boundary.

The decoded picture buffer 270 may store reconstructed pixel blocks. The inter prediction unit 211 may use reference pictures containing reconstructed pixel blocks to perform inter prediction on PUs of other pictures. In addition, the intra estimation unit 212 may use the reconstructed pixel blocks in the decoded picture buffer 270 to perform intra prediction on other PUs in the same picture as the CU.

The header information decoding unit or entropy encoding unit 280 may receive the quantized transform coefficients from the transform/quantization unit 230. The header information decoding unit or entropy encoding unit 280 may perform one or more entropy encoding on the quantized transform coefficients to generate entropy encoded data. For example, the header information decoding unit or entropy encoding unit 280 may entropy encoding on the data, such as context-adaptive variable-length codec (CAVLC), context-based adaptive binary arithmetic coding (CABAC), variable-to-variable (V2V) length coding, syntax-based context adaptive binary arithmetic coding (SBAC), probability interval partitioning entropy (PIPE) coding, or other types of entropy coding.

Figure 3:
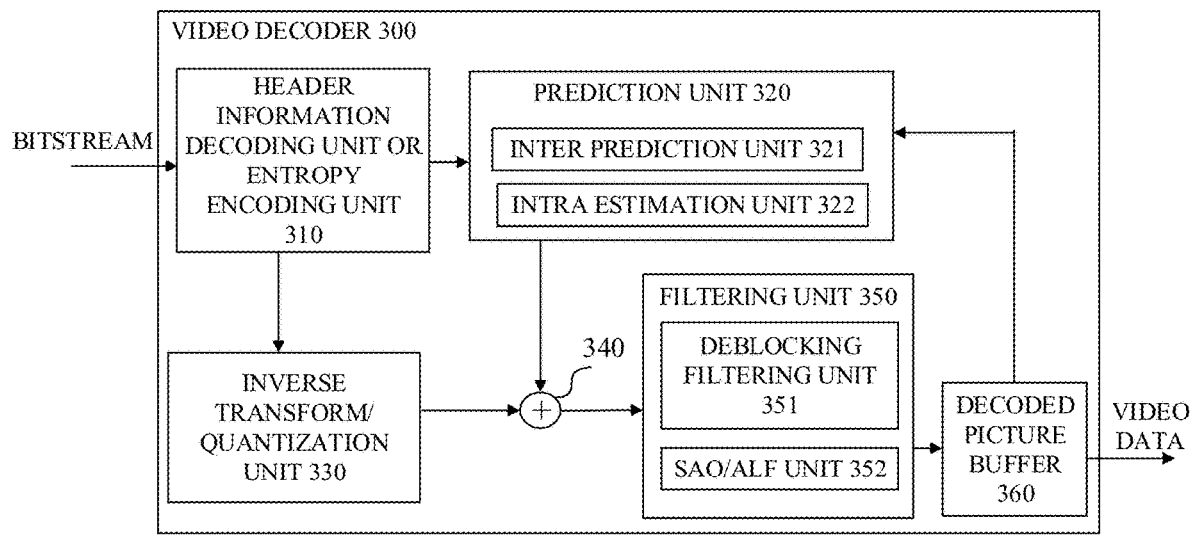
FIG. 3 is a schematic block diagram of a decoding framework 300 provided in implementations of the disclosure.

FIG. 3 is a schematic block diagram of a decoding framework 300 provided in implementations of the present disclosure.

As illustrated in FIG. 3, the video decoder 300 includes a header-information decoding unit 310, a prediction unit 320, an inverse quantization transform unit 330, a reconstruction unit 340, a filtering unit 350, and a decoded picture buffer 360. It should be noted that the video decoder 300 may include more, less, or different functional components.

After the header information decoding unit or entropy decoding unit 310 receives and parses the bitstream, the prediction block and the frequency-domain residual block may be obtained. The inverse quantization and transformation unit 330 may perform inverse transformation and inverse quantization on the frequency-domain residual block to obtain the time-domain residual block. The reconstruction unit 340 adds the prediction block obtained by the prediction unit 320 with the time-domain residual block from the inverse quantization transformation unit 330 to obtain a reconstructed picture block.

The video decoder 300 may receive a bitstream. The header-information decoding unit or entropy decoding unit 310 may parse the bitstream to extract syntax elements from the bitstream. As part of parsing the bitstream, the header-information decoding unit or entropy decoding unit 310 may parse entropy-encoded syntax elements in the bitstream. The prediction unit 320, the inverse quantization transform unit 330, the reconstruction unit 340, and the filtering unit 350 may decode video data according to the syntax elements extracted from the bitstream, and thus generate decoded video data.

In some implementations, the prediction unit 320 includes an intra prediction unit 321 and an inter estimation unit 322.

The intra prediction unit 321 may perform intra prediction to generate a prediction block of a PU. The intra prediction unit 322 may use an intra prediction mode to generate a prediction block of the PU based on a pixel block of a spatially-neighboring PU. The intra prediction unit 321 may also determine an intra prediction mode for the PU according to one or more syntax elements parsed from the bitstream.

The inter estimation unit 322 can construct a first reference picture list (list 0) and a second reference picture list (list 1) according to the syntax elements parsed from the bitstream. Furthermore, the header-information decoding unit or entropy decoding unit 310 may parse motion information of the PU if the PU is encoded using inter prediction. The inter estimation unit 322 may determine one or more reference blocks for the PU according to the motion information of the PU. The inter estimation unit 322 may generate a prediction block for the PU based on one or more reference blocks of the PU.

The inverse quantization transform unit 330 may perform inverse quantization on (i.e., dequantize) transform coefficients associated with a TU. The inverse quantization transform unit 330 may use a QP value associated with a CU of the TU to determine the degree of quantization.

After inverse quantization of the transform coefficients, the inverse quantization transform unit 330 may perform one or more inverse transformations on the inverse-quantized transform coefficients in order to generate a residual block associated with the TU. For example, For example, inverse DCT, inverse integer transform, inverse Karhunen-Loeve transform (KLT), inverse rotation transform, inverse directional transform, or other inverse transform corresponding to the transform at the encoding end can be applied to the inverse-quantized transform coefficients to obtain a residual block.

The reconstruction unit 340 uses the residual blocks associated with the TU of the CU and the prediction block of the PU of the CU to reconstruct a pixel block of the CU. For example, the reconstruction unit 340 may add samples in the residual block with corresponding samples in the prediction block to reconstruct the pixel block of the CU to obtain the reconstructed picture block.

The filtering unit 350 may perform deblocking filtering to reduce blocking effects of the pixel block associated with the CU.

In some implementations, the filtering unit 350 includes a deblocking filtering unit 351 and a SAO/ALF unit 352, where the deblocking filtering unit 351 is configured to remove blocking effects, and the SAO/ALF unit 262 is configured to remove ringing effects.

The deblocking filtering unit 351 in the implementations may be further configured to determine a boundary to-be-filtered of the reconstructed picture block, determine a boundary filtering strength of the boundary to-be-filtered according to encoding information of a first picture block and a second picture block which are adjacent to the boundary to-be-filtered on two sides of the boundary to-be-filtered respectively, determine a joint asymptotic feature of the boundary to-be-filtered according to sample values of samples at two sides of the boundary to-be-filtered when the boundary filtering strength of the boundary to-be-filtered is greater than a first preset value, and determine whether to filter the boundary to-be-filtered according to the joint asymptotic feature of the boundary to-be-filtered, where the joint asymptotic feature of the boundary to-be-filtered indicates whether the boundary to-be-filtered is a real boundary.

For example, if the boundary to-be-filtered is a vertical boundary, the first picture block and the second picture block form a first boundary area containing N rows of samples. In this case the deblocking filtering unit 351 determines an i-th row parameter according to a difference between a sample value of a distal sample and a sample value of a center sample in an i-th row of samples in the first boundary area, where i is an integer greater than or equal to 1 and less than N. The deblocking filtering unit 261 then determines at least one of the first to N-th row parameters as the joint asymptotic feature of the boundary to-be-filtered, and determines whether to filter the boundary to-be-filtered according to the joint asymptotic feature of the boundary to-be-filtered. For example, determine not to filter the boundary to-be-filtered when the at least two parameters of the first to N-th row parameters each are greater than or equal to a second preset value.

Since the joint asymptotic feature can truly reflect whether the boundary to-be-filtered is a real boundary, by determining whether to filter the boundary to-be-filtered based on the joint asymptotic feature, the accuracy of determining whether to filter can be improved, thus preventing the video decoder 300 from over-filtering of the real boundary.

The video decoder 300 may store the reconstructed picture of the CU in decoded picture buffer 360. The video decoder 300 may use the reconstructed picture in the decoded picture buffer 360 as a reference picture for subsequent prediction, or transmit the reconstructed picture to a display device for display.

In the following, the filtering process will be introduced in detailed.

Deblocking includes operations as follows.
1. Determine a filtering boundary. For example, the filtering boundary is determined from a reconstructed picture block according to a preset rule. Different video encoders or video decoders may select the filtering boundary in different manners. For example, for a boundary with a length of 4 pixels in the picture, whether to process the boundary is determined according to a flag and a grid line position where the boundary is located.

2. Calculate a boundary filtering strength (BS) of the filtering boundary. For example, The BS of the current boundary is determined based on encoding information of the coding blocks at two sides of the boundary. If the BS is not 0, proceed to Step 3.
3. Make a filtering decision to determine whether to perform deblocking filtering on the filtering boundary and, if filtering, whether to perform a strong filtering or a weak filtering. There may be a real boundary at the filtering boundary, that is, there is originally a great difference in pixel values of pixels at two sides of the filter boundary in the original captured picture. In order to reduce over-filtering of the real boundary, it is necessary to analyse the pixel values of samples at the two sides of the boundary, and determine whether to filter and what strength to use based on the analysis results. The BS is required for the analysis.

Figure 5A:
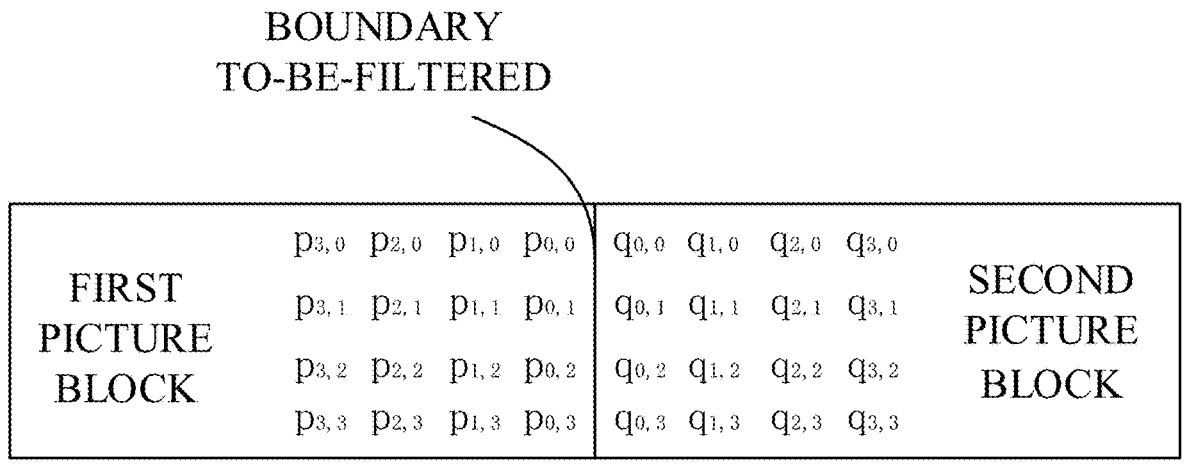
FIG. 5A is a schematic diagram of a first boundary area involved in implementations of the disclosure.

Taking FIG. 5A as an example, assume that a first picture block (also referring to block P) and a second picture block (also referring to block Q) are on two sides of the filtering boundary respectively. In a first row of samples in the first picture block, four samples adjacent to the filtering boundary are $p_{0,0}$, $p_{1,0}$, $p_{2,0}$, and $p_{3,0}$ sequentially. In a second row of samples in the first picture block, four samples adjacent to the filtering boundary are $p_{0,1}$, $p_{1,1}$, $p_{2,1}$, and $p_{3,1}$ sequentially. In a third row of samples in the first picture block, four samples adjacent to the filtering boundary are $p_{0,2}$, $p_{1,2}$, $p_{2,2}$, and $p_{3,2}$ sequentially. In a fourth row of samples in the first picture block, four samples adjacent to the filtering boundary are $p_{0,3}$, $p_{1,3}$, $p_{2,3}$, and $p_{3,3}$ sequentially. In a first row of samples in the second picture block, four samples adjacent to the filtering boundary are $q_{0,0}$, $q_{1,0}$, $q_{2,0}$, and $q_{3,0}$ sequentially. In a second row of samples in the second picture block, four samples adjacent to the filtering boundary are $q_{0,1}$, $q_{1,1}$, $q_{2,1}$, and $q_{3,1}$ sequentially. In a third row of samples in the second picture block, four samples adjacent to the filtering boundary are $q_{0,2}$, $q_{1,2}$, $q_{2,2}$, and $q_{3,2}$ sequentially. In a fourth row of samples in the second picture block, four samples adjacent to the filtering boundary are $q_{0,3}$, $q_{1,3}$, $q_{2,3}$, and $q_{3,3}$ sequentially.

A transformation rate of sample values of samples at two sides of the boundary is calculated based on formula (1):

$$dpqL = dp_0 + dp_3 + dq_0 + dq_3 \tag{1}$$

where $$dp_0 = |p_{2,0} - 2p_{1,0} + p_{0,0}| \tag{2}$$

$$dp_3 = |p_{2,3} - 2p_{1,3} + p_{0,3}| \tag{3}$$

$$dq_0 = |q_{2,0} - 2q_{1,0} + q_{0,0}| \tag{4}$$

$$dq_3 = |q_{2,3} - 2q_{1,3} + q_{0,3}| \tag{5}$$

If the transformation rate dbqL<β, determine to filter the boundary.

Optionally, β may be obtained by looking up a table.

Optionally, β may be a preset fixed value.

If it is determined to filter the boundary, determine whether to perform strong filtering or weak filtering on the boundary according to sample values of the samples at the two sides of the boundary.

For example, if formulas (6), (7), and (8) are satisfied at the same time, the strong filtering will be performed. Otherwise, the weak filtering will be performed. As illustrated in FIG. 5A, for 1=0, 1, 2, 3:

$$|p_{2,i} - 2p_{1,i} + p_{0,i}| + |q_{2,i} - 2q_{1,i} + q_{0,i}| < \beta/8 \tag{6}$$

$$|p_{3,i} - p_{0,i}| + |q_{0,i} - q_{3,i}| < \beta/8 \tag{7}$$

$$|p_{0,i} - q_{0,i}| \leq 2.5tc \tag{8}$$

Optionally, parameter tc may be obtained by looking up a table.

Optionally, parameter tc may be a preset fixed value.

4. According to the filtering decision, the filtering boundary is not filtered if it is determined not to filter the filtering boundary, strong filtering is performed if it is determined to perform strong filtering, and weak filtering is performed if it is determined to perform weak filtering.

As can be seen from the above, during determining whether the boundary is filtered in Step 3, it is determined whether the samples at the two sides of the boundary follow linear changes respectively. If the samples at the two sides are changed linearly, for example dpqL<β, filtering will be performed.

However, an over-filtering problem may occur when whether to filter a boundary is determined based merely on whether the samples at the two sides of the boundary follow linear changes according to formula (1). For example, a real boundary per se includes gradually changing samples. Based on the existing filtering determination methods in VVC, the real boundary will be determined as a boundary that can be filtered, which may result in over-filtering and blurring of the real boundary, thereby reducing the quality of the reconstructed picture.

Since the sample values of the samples at the real boundary will show an obvious concave or convex change trend relative to the sample values of the samples distal to the boundary, in this disclosure, the sample values of the samples at two sides of the boundary to-be-filtered are used to determine the joint asymptotic feature of the boundary to-be-filtered, where the joint asymptotic feature can reflect the change trend of the sample values of the samples at the boundary to-be-filtered versus the sample values of the samples distal to the boundary to-be-filtered. That is, the joint asymptotic feature can truly reflect whether the boundary to-be-filtered is the real boundary. In this way, determining whether to filter the boundary to-be-filtered based on the joint asymptotic feature can improve the accuracy of filtering decision, thereby reducing over-filtering of the real boundary.

The following describes the technical solution provided in the implementations of this disclosure in combination with specific implementations in detail.

Figure 4:
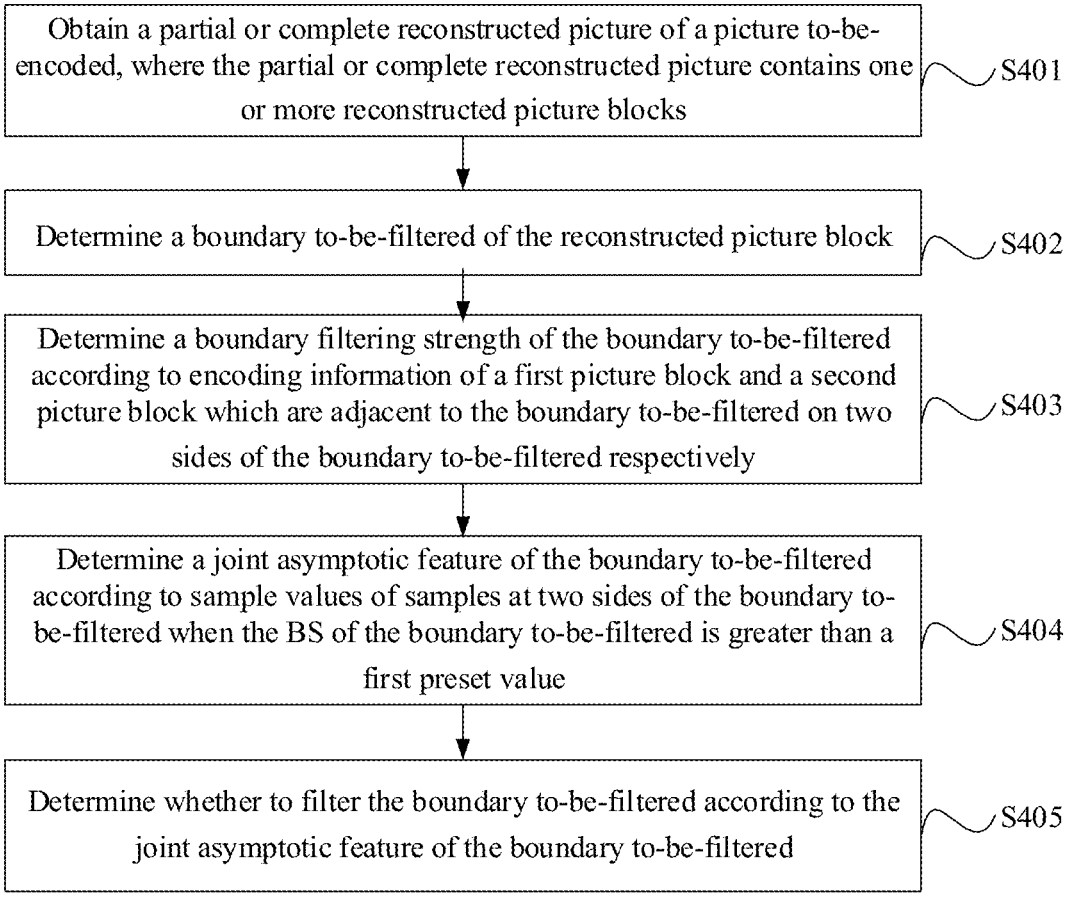
FIG. 4 is a schematic flowchart of a picture processing method 400 provided in implementations of the disclosure.

Firstly, introduction is given for the encoding side in combination with FIG. 4.

FIG. 4 is a schematic flowchart of a picture processing method provided in implementations of the disclosure. The implementations of the disclosure are applied to the video encoder illustrated in FIG. 1 and FIG. 2. As illustrated in FIG. 4, the method in the implementations of the disclosure includes the following.

At S401, a partial or complete reconstructed picture of a picture to-be-encoded is obtained, where the partial or complete reconstructed picture contains one or more reconstructed picture blocks.

Specifically, referring to FIG. 2, the video encoder partitions each picture in video data into one or more picture blocks to-be-encoded. For each picture block to-be-encoded, the prediction unit 210 in the video encoder generates a prediction block of the picture block to-be-encoded through inter prediction or intra prediction, and transmits the prediction block to the residual unit 220. The residual unit 220 may be understood as a summator, including one or more components that perform subtraction operations. The residual unit 220 subtracts the prediction block from the picture block to-be-encoded to generate a residual block, and transmits the residual block to the transform/quantization unit 230. The transform/quantization unit 230 transforms the residual block using, for example, discrete cosine transform (DCT) or similar transforms to obtain transform coefficients. The transform-quantization unit 230 further quantizes the transform coefficients to obtain the quantized transform coefficients.

As can be seen from FIG. 2, on the one hand, the transform quantization unit 230 forwards the quantized transform coefficients to the header information decoding unit or entropy decoding unit 280. The header information decoding unit or entropy decoding unit 280 performs entropy encoding on the quantized transform coefficients. For example, the header information decoding unit or entropy decoding unit 280 may perform entropy encoding on the quantized transform coefficients to obtain a bitstream, using encoding methods such as context adaptive variable length coding (CAVLC), context adaptive binary arithmetic coding (CABAC), syntax based context adaptive binary arithmetic coding (SBAC), probability interval divided entropy (PIPE) coding, etc.

On the other hand, the transform quantization unit 230 forwards the quantized transform coefficients to the inverse transform quantization unit 240. The inverse transform quantization unit 240 performs inverse quantization and inverse transformation on the quantized transform coefficients to reconstruct a residual block in the pixel domain. The reconstruction unit 250 may be understood as a summator and includes one or more components that perform subtraction operations. The reconstruction unit 250 adds the reconstructed residual block to the prediction block generated by the prediction unit 210 to generate the partial or complete reconstructed picture of the picture to-be-encoded, which includes one or more reconstructed picture blocks.

At S402, a boundary to-be-filtered of the reconstructed picture block is determined.

Different video encoders may select the boundary to-be-filtered in different manners. For example, in H.264, a boundary of a 4×4 block is taken as the boundary to-be-filtered. For example, in H.265, for a boundary of each 8×8 sub-block in a CU, if the boundary is a partitioned boundary of a TU of the CU, the boundary is determined as the boundary to-be-filtered. If the boundary is a partitioned boundary of a PU of the CU, the boundary is set as the boundary to-be-filtered.

Figure 5B:
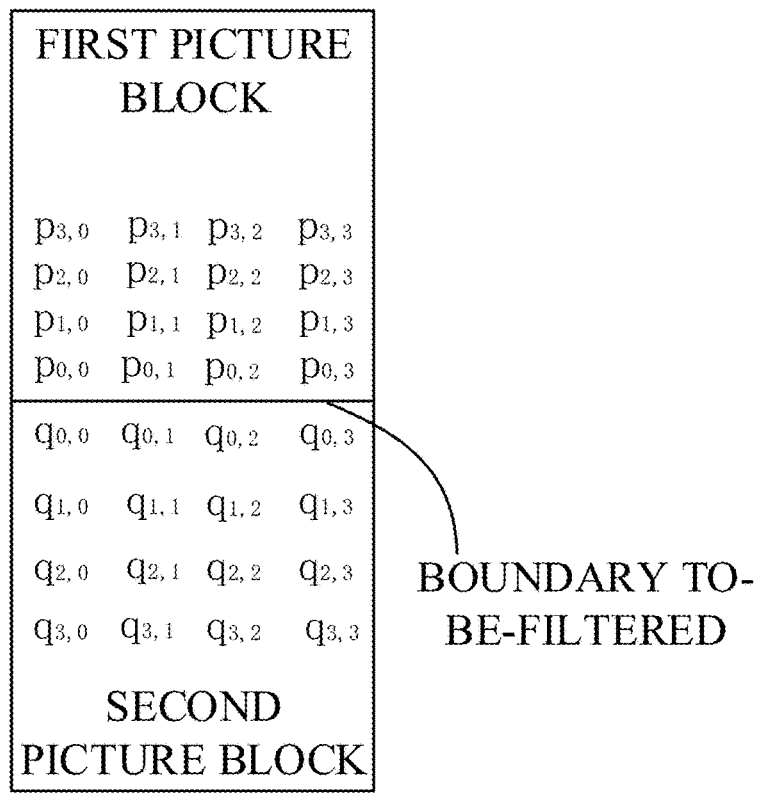
FIG. 5B is a schematic diagram of a second boundary area involved in implementations of the disclosure.

As illustrated in FIG. 5A and FIG. 5B, the boundary to-be-filtered may be a vertical boundary or a horizontal boundary.

In implementations of the disclosure, the "boundary" may also be referred to as an "edge".

At S403, a boundary filtering strength (BS) of the boundary to-be-filtered is determined according to encoding information of a first picture block and a second picture block which are adjacent to the boundary to-be-filtered on two sides of the boundary to-be-filtered respectively.

For example, as illustrated in FIG. 5A, if the boundary to-be-filtered is a vertical boundary, the first picture block is a picture block adjacent to the boundary to-be-filtered on the left of the boundary to-be-filtered, and the second picture block is a picture block adjacent to the boundary to-be-filtered on the right of the boundary to-be-filtered.

For example, as illustrated in FIG. 5B, if the boundary to-be-filtered is a horizontal boundary, the first picture block is a picture block adjacent to the boundary to-be-filtered on the top of the boundary to-be-filtered, and the second picture block is a picture block adjacent to the boundary to-be-filtered on the bottom of the boundary to-be-filtered.

FIG. 5A and FIG. 5B illustrate exemplarily the first picture block and the second picture block each with a size of 4×4. It should be noted that the first picture block and the second picture block may also have a size of 2×2, 6×6, 8×8, 16×16, 32×32, etc. The specific sizes of the first picture block and the second picture block are not limited in the implementations of the disclosure, which may be determined according to the size of the reconstructed picture block and actual needs.

The encoding information of the first picture block and the second picture block include, but are not limited to, encoding methods, quantization parameters, motion vectors, quantized residual coefficients, flags, etc.

Since different filtering methods may be applied to boundaries to-be-filtered with different BSs, the BS of the boundary to-be-filtered needs to be determined before filtering the boundary to-be-filtered.

For example, the BS of the boundary to-be-filtered is determined according to the encoding information of the first picture block and the encoding information of the second picture block as follows.

1. If the prediction mode of the first picture block or the second picture block is an intra prediction mode, BS=2;
2. If step 1 is not satisfied, then if the first picture block or the second picture block has a non-zero quantization coefficient (non-0coeffs), BS=1;
3. If step 1 and step 2 are not satisfied, then if the first picture block and the second picture block have different reference picture, BS=1;
4. If step 1, step 2, and step 3 are not satisfied, then if an absolute value of a difference between a horizontal component of a motion vector of the first picture block and a horizontal component of a motion vector of the second picture block is greater than or equal to 4, or if an absolute value of a different between vertical components thereof is greater than or equal to 4, BS=1.

It should be noted that in this step, the BS of the boundary to-be-filtered may be determined using methods specified in current standards.

At S404, a joint asymptotic feature of the boundary to-be-filtered is determined according to sample values of samples at two sides of the boundary to-be-filtered when the BS of the boundary to-be-filtered is greater than a first preset value.

The specific value of the first preset value is not limited in implementations of the disclosure. For example, as can be seen from S403, the BS of the boundary to-be-filtered may be 1 or 2. Therefore, the first preset value may be 0 or 1.

In one example, if the first preset value is 1, operations at S404 may be understood as determining the joint asymptotic feature of the boundary to-be-filtered according to the sample values of samples at two sides of the boundary to-be-filtered when the BS of the boundary to-be-filtered is 2.

In another example, if the first preset value is 0, operations at S404 may be understood as determining the joint asymptotic feature of the boundary to-be-filtered according to the sample values of samples at two sides of the boundary to-be-filtered when the BS of the boundary to-be-filtered is 1 or 2.

The sample values of samples may be understood as reconstructed values of the samples, that is, sample values reconstructed during picture reconstruction.

Figure 5C:
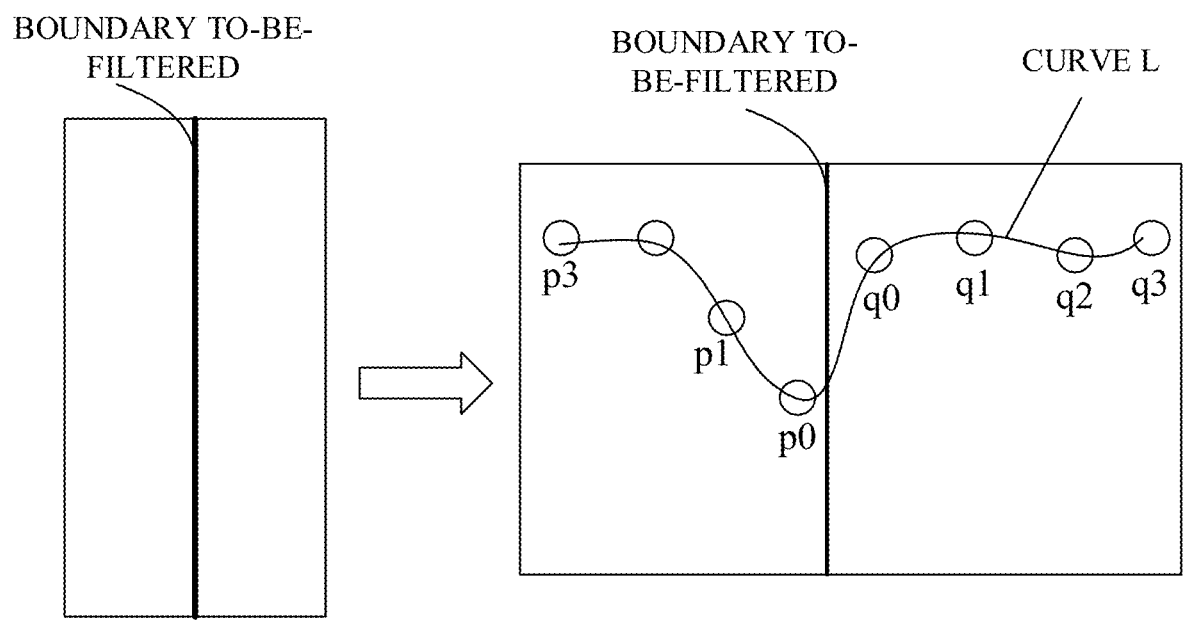
FIG. 5C is a schematic diagram of a curve formed by sample values of samples at two sides of the boundary to-be-filtered involved in implementations of the disclosure.

In implementations of the disclosure, the joint asymptotic feature of the boundary to-be-filtered indicates the change trend (change convexly or change concavely, in other words, convex change or concave change) of the sample values of samples at the boundary to-be-filtered relative to the sample values of samples distal to the boundary to-be-filtered. In other words, the joint asymptotic feature may be indicative of whether the boundary to-be-filtered is a real boundary. For example, as illustrated in FIG. 5C, the figure on the right is an original boundary diagram of the boundary to-be-filtered. Samples on the left of the boundary to-be-filtered are $p_0$, $p_1$, $p_2$, and $p_3$, and samples on the right of the boundary to-be-filtered are $q_0$, $q_1$, $q_2$, and $q_3$, where $p_0$, $p_1$, $p_2$, and $p_3$ fall into the first picture block and $q_0$, $q_1$, $q_2$, and $q_3$ fall into the second picture block. A curve L is formed by connecting sequentially sample values of the samples $p_0$, $p_1$, $p_2$, $p_3$, $q_0$, $q_1$, $q_2$, and $q_3$ from left to right. As illustrated in FIG. 5C, the curve L is concave upward obviously at the boundary to-be-filtered. In other words, the sample values of samples at the boundary to-be-filtered have an obvious concave change relative to the sample values of samples distal to the boundary to-be-filtered.

In some implementations, operations at S404 in which the joint asymptotic feature of the boundary to-be-filtered is determined according to the sample values of samples at two sides of the boundary to-be-filtered may include operations at S404-A1.

At S404-A1, the joint asymptotic feature of the boundary to-be-filtered is determined according to a difference between a sample value of a center sample and a sample value of a distal sample in the samples at two sides of the boundary to-be-filtered, where the center sample in the samples at two sides of the boundary to-be-filtered is adjacent to the boundary to-be-filtered, and the distal sample in the samples at two sides of the boundary to-be-filtered is adjacent to the center sample. In this example, the center sample adjacent to the boundary to-be-filtered may be understood as a sample at the boundary to-be-filtered. In this case, the joint asymptotic feature of the boundary to-be-filtered is determined according to the difference between the sample value of the center sample and the sample value of the distal sample in the samples at two sides of the boundary to-be-filtered. For example, if the difference is greater than a certain preset value b1, it indicates that the sample values of samples at the boundary to-be-filtered have an obvious convex change relative to the sample values of samples distal to the boundary to-be-filtered, and thus the boundary to-be-filtered may be determined as a real boundary. For example, if the difference is less than a certain preset value b2, it indicates that the sample values of samples at the boundary to-be-filtered have an obvious concave change relative to the sample values of samples distal to the boundary to-be-filtered, and thus the boundary to-be-filtered may be determined as a real boundary. For example, if the difference is greater than the preset value b2 and less than the preset value b1, it indicates that the sample values of samples at the boundary to-be-filtered have a less obvious change relative to the sample values of samples distal to the boundary to-be-filtered, and thus it can be determined that the boundary to-be-filtered is not a real boundary.

The samples at the two side of the boundary to-be-filtered may be in a same row or in different rows, which is not limited in implementations of the disclosure.

As can be seem from FIG. 5A and FIG. 5B, the boundary to-be-filtered may be a vertical boundary or a horizontal boundary. For different kinds of boundaries, different operations are performed for S404-A1 in which the joint asymptotic feature of the boundary to-be-filtered is determined according to the difference between the sample value of the center sample and the sample value of the distal sample in the samples at two sides of the boundary to-be-filtered. In the following, two case are introduced respectively.

Case 1, when the boundary to-be-filtered is a vertical boundary, the first picture block and the second picture block form a first boundary area containing N rows of samples, where N is a positive integer, such as 2, 3, 4, 6, 7, 8, etc. A first row parameter may be understood as a row parameter corresponding to the first row of samples, which indicates whether the sample values of the center samples adjacent to the boundary to-be-filtered have a concave or convex change relative to the sample values of the distal samples in the first row of samples. A second row parameter may be understood as a row parameter corresponding to the second row of samples, which indicates whether the sample values of the center samples adjacent to the boundary to-be-filtered have a concave or convex change relative to the sample values of the distal samples in the second row of samples. Similarly, an N-th row parameter may be understood as a row parameter corresponding to the N-th row of samples, which indicates whether the sample values of the center samples adjacent to the boundary to-be-filtered have a concave or convex change relative to the sample values of the distal samples in the N-th row of samples.

In case 1, operations at S404-A1 may include operations at S404-A11 and S404-A12.

At S404-A11, an i-th row parameter is determined according to a difference between a sample value of a distal sample and a sample value of a center sample in an i-th row of samples in the first boundary area, where i is a positive integer greater than or equal to 1 and less than N.

At S404-A12, at least one of the first to N-th row parameters is determined as the joint asymptotic feature of the boundary to-be-filtered.

In operation at A11, the distal sample in the i-th row of samples may be one or more leftmost samples in the i-th row of samples, and one or more rightmost samples in the i-th row of samples, such as $p_{3,0}$ and $q_{3,0}$ in FIG. 5A. Optionally, the distal sample in the i-th row of samples may be a sample near the left end but not leftmost in the i-th row of samples, and a sample near the right end but not rightmost in the i-th row of samples, such as $p_{2,0}$ and $q_{2,0}$ in FIG. 5A. The center sample in the i-th row of samples may be one or more samples near the boundary to-be-filtered, for example, a sample adjacent to and on the left of the boundary to-be-filtered and a sample adjacent to and on the right of the boundary to-be-filtered, such as $p_{0,0}$ and $q_{0,0}$ in FIG. 5A.

In an example, the center sample in the i-th row of samples includes: in the i-th row of samples, a first left sample (such as $p_{0,i}$) adjacent to the boundary to-be-filtered and a second left sample (such as $p_{1,i}$) adjacent to the first left sample on the left side of the boundary to-be-filtered, and a first right sample (such as $q_{0,i}$) adjacent to the boundary to-be-filtered and a second right sample (such as $q_{1,i}$) adjacent to the first right sample on the right side of the boundary to-be-filtered. The distal sample in the i-th row of samples includes: in the i-th row of samples, a third left sample (such as $p_{2,i}$) adjacent to the second left sample and a third right sample (such as $q_{2,i}$) adjacent to the second right sample.

In this example, operations at S404-A11 may include operations at S404-A111.

At S404-A111, the i-th row parameter is determined according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the i-th row of samples.

Because the sample closer to the boundary to-be-filtered can more accurately reflect whether the boundary to-be-filtered is a real boundary, in this example, the sample far away from boundary to-be-filtered is discarded, and the sample closer to boundary to-be-filtered on the left or right side of the boundary to-be-filtered is used to determine the i-th row parameter. In this way, the i-th row parameter can be accurately determined, the calculation amount can be reduced, the speed of determining a filtering boundary can be improved, and the encoding or decoding efficiency can be improved.

In a possible implementation, the i-th row parameter may be determined according to the following formula (9):

$$dpq_i = |2p_{2,i} - p_{1,i} - p_{0,i} + 2q_{2,i} - q_{1,i} - q_{0,i}| \qquad (9)$$

where $dpq_i$ represents the i-th row parameter, $p_{0,i}$ represents the first left sample in the i-th row of samples, $p_{1,i}$ represents the second left sample in the i-th row of samples, $p_{2,i}$ represents the third left sample in the i-th row of samples, $q_{0,i}$ represents the first right sample in the i-th row of samples, $q_{1,i}$ represents the second right sample in the i-th row of samples, $q_{2,i}$ represents the third right sample in the i-th row of samples.

Any of the first to N-th row parameters may be determined in the above manner. Then operations at S404-A12 are performed, where any one of the first to N-th row parameters is determined as the joint asymptotic feature of the boundary to-be-filtered. For example, as illustrated in FIG. 5A, the first boundary area formed by the first picture block and the second picture block has a size of 4×8, including 4 rows of samples and 8 columns of samples. Using the above method, any one row parameter may be determined, and the determined row parameter may be determined as the joint asymptotic feature of the boundary to-be-filtered. For example, the first row parameter may be determined as the joint asymptotic feature of the boundary to-be-filtered. Optionally, any two row parameters may be determined from the first, second, third, and fourth row parameters, and the two row parameters may be determined as the joint asymptotic feature of the boundary to-be-filtered. For example, the first row parameter and the fourth row parameter may be determined as the joint asymptotic feature of the boundary to-be-filtered.

Case 2, when the boundary to-be-filtered is a horizontal boundary, the first picture block and the second picture block form a second boundary area containing M columns of samples, where M is a positive integer, such as 2, 3, 4, 6, 7, 8, etc. A first column parameter may be understood as a column parameter corresponding to the first column of samples, which indicates whether the sample values of the center samples adjacent to the boundary to-be-filtered have a concave or convex change relative to the sample values of the distal samples in the first column of samples. A second column parameter may be understood as a column parameter corresponding to the second column of samples, which indicates whether the sample values of the center samples adjacent to the boundary to-be-filtered have a concave or convex change relative to the sample values of the distal samples in the second column of samples. Similarly, an M-th column parameter may be understood as a column parameter corresponding to the M-th column of samples, which indicates whether the sample values of the center samples adjacent to the boundary to-be-filtered have a concave or convex change relative to the sample values of the distal samples in the M-th column of samples.

In case 2, operations at S404-A1 may include operations at S404-A14 and S404-A15.

At S404-A14, a j-th column parameter is determined according to a difference between a sample value of a distal sample and a sample value of a center sample in a j-th column of samples in the second boundary area, where j is an integer greater than or equal to 1 and less than M.

At S404-A15, at least one of the first to M-th column parameters is determined as the joint asymptotic feature of the boundary to-be-filtered.

In this operation at A14, the distal sample in the j-th column of samples may be one or more topmost samples in the j-th column of samples, and one or more bottommost samples in the j-th column of samples, such as $p_{3,0}$ and $q_{3,0}$ in FIG. 5B. Optionally, the distal sample in the j-th column of samples may be a sample near the top end but not topmost in the j-th column of samples, and a sample near the bottom end but not bottommost in the j-th column of samples, such as $p_{2,0}$ and $q_{2,0}$ in FIG. 5B. The center sample in the j-th column of samples may be one or more samples near the boundary to-be-filtered, for example, a sample adjacent to and on the top of the boundary to-be-filtered and a sample adjacent to and on the bottom of the boundary to-be-filtered, such as $p_{0,0}$ and $q_{0,0}$ in FIG. 5B.

In an example, the center sample in the j-th column of samples includes: in the j-th column of samples, a first top sample (such as $p_{0,j}$) adjacent to the boundary to-be-filtered and a second top sample (such as $p_{1,j}$) adjacent to the first top sample on the top of the boundary to-be-filtered, and a first bottom sample (such as $q_{0,j}$) adjacent to the boundary to-be-filtered and a second bottom sample (such as $q_{1,j}$) adjacent to the first bottom sample on the bottom of the boundary to-be-filtered. The distal sample in the j-th column of samples includes: in the j-th column of samples, a third top sample (such as $p_{2,j}$) adjacent to the second top sample and a third bottom sample (such as $q_{2,j}$) adjacent to the second bottom sample.

In this example, operations at S404-A14 may include operations at S404-A141.

At S404-A141, the j-th column parameter is determined according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between a sample value of the third bottom sample and a sample value of the second bottom sample in the j-th column of samples.

In a possible implementation, the j-th column parameter may be determined according to the following formula (10):

$$dpq_j = |2p_{2,j} - p_{1,j} - p_{0,j} + 2q_{2,j} - q_{1,j} - q_{0,j}| \qquad (10)$$

where $dpq_j$ represents the j-th column parameter, $p_{0,j}$ represents the first top sample in the j-th column of samples, $p_{1,j}$ represents the second top sample in the j-th column of samples, $p_{2,j}$ represents the third top sample in the j-th column of samples, $q_{0,j}$ represents the first bottom sample in the j-th column of samples, $q_{1,j}$ represents the second bottom sample in the j-th column of samples, $q_{2,j}$ represents the third bottom sample in the j-th column of samples.

Any of the first to M-th column parameters may be determined in the above manner. Then operations at S404-A15 are performed, where any one of the first to M-th column parameters is determined as the joint asymptotic feature of the boundary to-be-filtered. For example, as illustrated in FIG. 5B, the second boundary area formed by the first picture block and the second picture block has a size of 8×4, including 4 columns of samples and 8 rows of sample. Using the above method, any one column parameter may be determined, and the determined column parameter may be determined as the joint asymptotic feature of the boundary to-be-filtered. For example, the first column parameter may be determined as the joint asymptotic feature of the boundary to-be-filtered. Optionally, any two column parameters may be determined from the first, second, third, and fourth column parameters and determined as the joint asymptotic feature of the boundary to-be-filtered. For example, the first column parameter and the fourth column parameter may be determined as the joint asymptotic feature of the boundary to-be-filtered.

At S405, whether to filter the boundary to-be-filtered is determined according to the joint asymptotic feature of the boundary to-be-filtered.

In this disclosure, to prevent filtering of a real boundary, the joint asymptotic feature of the boundary to-be-filtered is determined, and whether to filter the boundary to-be-filtered is determined according to the joint asymptotic feature of the boundary to-be-filtered. For example, if the joint asymptotic feature of the boundary to-be-filtered is greater than the preset value b1 or less than the preset value b2, it indicates that the boundary to-be-filtered is a real boundary, and the boundary to-be-filtered will not be filtered. If the joint asymptotic feature of the boundary to-be-filtered is greater than b2 and less than b1, it indicates that the boundary to-be-filtered is not a real boundary, and the boundary to-be-filtered will be filtered.

The following will describe in detail the process of determining whether to filter the boundary to-be-filtered based on the joint asymptotic feature of the boundary to-be-filtered.

Referring to the above case 1, when the boundary to-be-filtered is the vertical boundary, operations at S405 may include the following conditions.

In a first condition, operations at S405 includes: determining not to filter the boundary to-be-filtered when at least two parameters of the first to N-th row parameters each are greater than or equal to a second preset value.

For example, determine not to filter the boundary to-be-filtered when at least two parameters of the first to N-th row parameters each are satisfy the following formula (11):

$$dpq_i \geq T2 \qquad (11)$$

where $dbq_i$ represents the i-th row parameter, and T2 represents the second preset value.

For example, referring to FIG. 5A, assuming N=4, when any two of the first, second, third, and fourth row parameters are greater than or equal to the second preset value T2, determine not to filter the boundary to-be-filtered. For example, when both the first row parameter and the fourth row parameter are greater than or equal to the second preset value T2, determine not to filter the boundary to-be-filtered.

Optionally, the second preset value T2 is greater than 0.5 and less than 1.

Optionally, the second preset value T2 is greater than 0.5 and less than 0.8.

Optionally, the second preset value T2 may be determined according to a quantization parameter (QP). For example, a parameter β' may be obtained by looking up a table using the QP, where β' has a positive correlation with the second preset value T2. That is, when β' increases, the second preset value T2 increases. Based on this, according to a preset calculation rule, the second preset value T2 is obtained by calculating with β', where the second preset value T2 is less than 1.

Optionally, the second preset value T2 is equal to $$\frac{1}{2}\beta,$$

where β may be obtained through a look up table or may be a preset value.

In a second condition, operations at S405 includes determining not to filter the boundary to-be-filtered when a sum of any two of the first to N-th row parameters is greater than or equal to a fourth preset value T4.

For example, referring to FIG. 5A, assuming N=4, when a sum of any two of the first, second, third, and fourth row parameters is greater than or equal to the fourth preset value T4, determine not to filter the boundary to-be-filtered. For example, when the sum of the first row parameter and the fourth row parameter is greater than or equal to the fourth preset value T4, determine not to filter the boundary to-be-filtered.

Optionally, the fourth preset value T4 is greater than or equal to twice the second preset value.

Optionally, the fourth preset value T4 is equal to β.

In a third condition, operations at S405 includes operations at S405-B1 and S405-B2.

At S405-B1, a transformation rate of sample values of samples at two sides of the boundary to-be-filtered is determined according to the sample values of samples at two sides of the boundary to-be-filtered.

At S405-B2, whether to filter the boundary to-be-filtered is determined according to the transformation rate and at least one of the first to N-th row parameters.

In one example, in operations at S405-B1, a transformation rate of sample values of each row of samples may be determined according to the sample values of each of the N rows of samples in the first boundary area, so as to obtain a transformation rate of sample values of N rows of samples. Then the transformation rate of sample values of samples at two sides of the boundary to-be-filtered is determined according to the transformation rate of sample values of N rows of samples.

In another example, the transformation rate of sample values of samples at two sides of the boundary to-be-filtered is determined according to a transformation rate of sample values of any two rows of samples in the N rows of samples. For example, the transformation rate of sample values of samples at two sides of the boundary to-be-filtered is determined according to a transformation rate of sample values of the first row of samples and the N-th row of samples.

For example, the transformation rate dbqL of sample values of samples at two sides of the boundary to-be-filtered may be determined according to the above formula (1).

The above operations at S405-B2 of determining whether to filter the boundary to-be-filtered according to the transformation rate and at least one of the first to N-th row parameters may include different instances.

Instance 1, determine to filter the boundary to-be-filtered when the transformation rate is less than a third preset value T3 and the at least one of the first to N-th row parameters is less than a fifth preset value T5.

For example, as illustrated in FIG. 5A, determine to filter the boundary to-be-filtered when the following formulas (12) and (13) are satisfied:

$$dpqL<T3 \tag{12}$$

$$dbq0<T5 \text{ or } dbq3<T5 \tag{13}$$

where T3 represents the third preset value, T5 represents the fifth preset value, dbqL represents the transformation rate of sample values of the first and fourth rows of samples and may be determined according to the above formula (1), dpq0 represents the first row parameter, and dpq3 represents the fourth row parameter.

Optionally, the third preset value T3=β.

Optionally, the third preset value is twice the second preset value. For example, when the third preset value T3=β, $$T2 = \frac{1}{2}\beta.$$

Optionally, the fifth preset value is half of a sixth preset value. For example, when the sixth preset value T6=β, $$T5 = \frac{1}{2}\beta.$$

Optionally, the fifth preset value T5 may be equal to the second preset value T2. For example, $$T2 = T5 = \frac{1}{2}\beta.$$

Instance 2, determine not to filter the boundary to-be-filtered when the transformation rate is greater than or equal to the third preset value T3, and/or the at least two of the first to N-th row parameters each are greater than or equal to the sixth preset value T6.

For example, determine not to filter the boundary to-be-filtered when the transformation rate is greater than or equal to the third preset value T3. For another example, determine not to filter the boundary to-be-filtered when the at least two of the first to N-th row parameters each are greater than or equal to the sixth preset value T6. For another example, determine not to filter the boundary to-be-filtered when the transformation rate is greater than or equal to the third preset value T3 and the at least two of the first to N-th row parameters each are greater than or equal to the sixth preset value T6.

Optionally, the sixth preset value T6 is equal to the fifth preset value T5.

Optionally, the sixth preset value T6 is equal to the second preset value T2.

Instance 3, determine to filter the boundary to-be-filtered when the transformation rate is less than the third preset value T3 and a sum of any two of the first to N-th row parameters is less than a seventh preset value T7.

For example, as illustrated in FIG. 5A, assuming that the any two of the first to N-th row parameters are the first row parameter dpq0 and the fourth row parameter dpq3, determine to filter the boundary to-be-filtered when the formulas (12) and (14) are satisfied:

$$dpq0+dpq3<T7 \tag{14}$$

Optionally, the seventh preset value T7 is equal to β.

Instance 4, determine not to filter the boundary to-be-filtered when the transformation rate is greater than or equal to the third preset value T3, and/or a sum of any two of the first to N-th row parameters is greater than or equal to an eighth preset value T8.

Optionally, the eighth preset value T8 is equal to the seventh preset value T7.

Optionally, the eighth preset value T8 is equal to the third preset value T3.

In the implementations of the disclosure, when the boundary to-be-filtered is the vertical boundary, whether to filter the boundary to-be-filtered may be determined according to at least one of the first to N-th row parameters, which can reduce overfiltering of the real boundary.

In combination with the above, referring to case 2 that the boundary to-be-filtered is a horizontal boundary, the following will describe in detail the process of determining whether to filter the boundary to-be-filtered according to the joint asymptotic feature of the boundary to-be-filtered.

When the boundary to-be-filtered is the horizontal boundary, operations at S405 may include the following conditions.

In a first condition, operations at S405 includes determining not to filter the boundary to-be-filtered when at least two of the first to M-th column parameters each are greater than or equal to the second preset value.

For example, determine not to filter the boundary to-be-filtered when at least two parameters of the first to M-th column parameters each are satisfy the following formula (15):

$$dpq_j \geq T2 \tag{15}$$

Where $dbq_j$ represents the j-th column parameter, and T2 represents the second preset value.

For example, referring to FIG. 5B, assuming M=4, when any two of the first, second, third, and fourth column parameters are greater than or equal to the second preset value T2, determine not to filter the boundary to-be-filtered. For example, when both the first column parameter and the fourth column parameter are greater than or equal to the second preset value T2, determine not to filter the boundary to-be-filtered.

In a second condition, operations at S405 includes determining not to filter the boundary to-be-filtered when a sum of any two of the first to M-th column parameters is greater than or equal to the fourth preset value T4.

For example, referring to FIG. 5B, assuming M=4, when the sum of any two of the first, second, third, and fourth column parameters is greater than or equal to the fourth preset value T4, determine not to filter the boundary to-be-filtered. For example, when the sum of the first column parameter and the fourth column parameter is greater than or equal to the fourth preset value T4, determine not to filter the boundary to-be-filtered.

In a third condition, operations at S405 includes operations at S405-D1 and S405-D2.

At S405-D1, a transformation rate of sample values of samples at two sides of the boundary to-be-filtered is determined according to the sample values of samples at two sides of the boundary to-be-filtered.

At S405-D2, whether to filter the boundary to-be-filtered is determined according to the transformation rate and at least one of the first to M-th column parameters.

In one example, in operations at S405-D1, a transformation rate of sample values of each column of samples may be determined according to the sample values of each of the M columns of samples in the second boundary area, so as to obtain a transformation rate of sample values of the M columns of samples. Then the transformation rate of sample values of samples at two sides of the boundary to-be-filtered is determined according to the transformation rate of sample values of the M columns of samples.

In another example, the transformation rate of sample values of samples at two sides of the boundary to-be-filtered is determined according to a transformation rate of sample values of any two columns of samples in the M columns of samples. For example, the transformation rate of sample values of samples at two sides of the boundary to-be-filtered is determined according to a transformation rate of sample values of the first and M-th columns of samples.

For example, the transformation rate dbqL of sample values of samples at two sides of the boundary to-be-filtered may be determined according to the above formula (1).

The above operations at S405-D2 of determining whether to filter the boundary to-be-filtered according to the transformation rate and at least one of the first to M-th column parameters may include different instances.

Instance 1, determine to filter the boundary to-be-filtered when the transformation rate is less than the third preset value T3 and the at least one of the first to M-th column parameters is less than the fifth preset value T5.

For example, as illustrated in FIG. 5B, determine to filter the boundary to-be-filtered when the following formulas (16) and (17) are satisfied:

$$dpqL < T3 \quad (16)$$

$$dbq0 < T5 \text{ or } dbq3 < T5 \quad (17)$$

where dbqL represents the transformation rate of sample values of the first column and the fourth column of samples and may be determined according to the above formula (1), dpq0 represents the first column parameter, and dpq3 represents the fourth column parameter.

Instance 2, determine not to filter the boundary to-be-filtered when the transformation rate is greater than or equal to the third preset value T3, and/or the at least two of the first to M-th column parameters each are greater than or equal to the sixth preset value T6.

Instance 3, determine to filter the boundary to-be-filtered when the transformation rate is less than the third preset value T3 and a sum of any two of the first to M-th column parameters is less than the seventh preset value T7.

Instance 4, determine not to filter the boundary to-be-filtered when the transformation rate is greater than or equal to the third preset value T3, and/or a sum of any two of the first to M-th column parameters is greater than or equal to the eighth preset value T8.

It should be noted that reference for operations at S405-D1 and S405-D2 may be made to the description of operations at S405-B1 and S405-B2 above, which will not repeated herein.

In the implementations of the disclosure, when the boundary to-be-filtered is the horizontal boundary, whether to filter the boundary to-be-filtered may be determined according to at least one of the first to M-th column parameters, which can reduce over-filtering of the real boundary.

Figure 6:
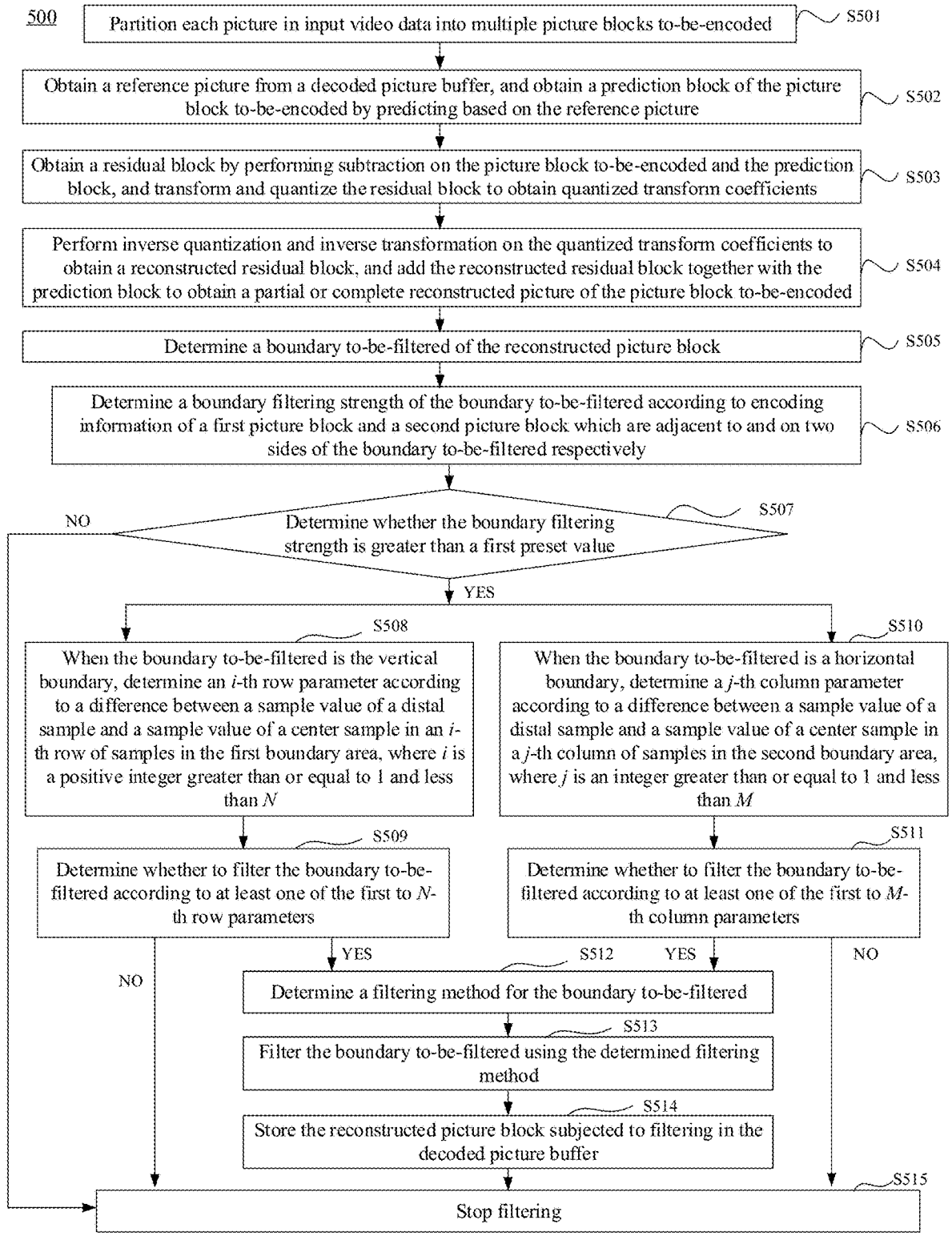
FIG. 6 is a schematic flowchart of a picture processing method 500 provided in implementations of the disclosure.

FIG. 6 is another schematic flowchart of a picture processing method 500 provided in implementations of the disclosure. As illustrated in FIG. 6, the method 500 includes the following.

At S501, each picture in input video data is partitioned into multiple picture blocks to-be-encoded. For example, for each picture (or frame), the video encoder partitions the picture into one or more coding units (CUs).

At S502, a reference picture(s) is obtained from a decoded picture buffer, and a prediction block of the picture block to-be-encoded is obtained by predicting based on the reference picture. For example, based on the reference picture, the prediction block of the picture block to-be-encoded is obtained by predicting using intra prediction or inter estimation.

At S503, a residual block is obtained by performing subtraction on the picture block to-be-encoded and the prediction block, and the residual block is transformed and quantized to obtain quantized transform coefficients.

The quantized transform coefficients are input into the entropy encoder and encoded to output a bitstream.

Moreover, operations at S504 are performed.

At S504, inverse quantization and inverse transformation are performed on the quantized transform coefficients to obtain a reconstructed residual block, and the reconstructed residual block is added together with the prediction block to obtain a partial or complete reconstructed picture of the picture block to-be-encoded. The partial or complete reconstructed picture includes one or more reconstructed picture blocks.

At S505, a boundary to-be-filtered of the reconstructed picture block is determined. The boundary to-be-filtered may be a horizontal boundary or a vertical boundary. Reference for this operation may be made to description of S402 above, which will not be repeated herein.

At S506, a boundary filtering strength of the boundary to-be-filtered is determined according to a first picture block and a second picture block which are adjacent to the boundary to-be-filtered on two sides of the boundary to-be-filtered respectively. Reference for this operation may be made to description of S403 above, which will not be repeated herein.

At S507, determine whether the boundary filtering strength is greater than a first preset value. If the boundary filtering strength is not greater than the first preset value, operations at S515 will be performed. If the boundary filtering strength is greater than the first preset value, operations at S508 and S509 will be performed, or operations at S510 and S511 will be performed.

At S508, when the boundary to-be-filtered is the vertical boundary, an i-th row parameter is determined according to a difference between a sample value of a distal sample and a sample value of a center sample in an i-th row of samples in the first boundary area, where i is a positive integer greater than or equal to 1 and less than N.

At S509, determine whether to filter the boundary to-be-filtered according to at least one of the first to N-th row parameters.

For example, determine not to filter the boundary to-be-filtered when at least two parameters of the first to N-th row parameters each are greater than or equal to a second preset value. Optionally, determine not to filter the boundary to-be-filtered when a sum of any two of the first to N-th row parameters is greater than or equal to a fourth preset value. Optionally, determine to filter the boundary to-be-filtered when the transformation rate is less than a third preset value and the at least one of the first to N-th row parameters is less than a fifth preset value. Optionally, determine not to filter the boundary to-be-filtered when the transformation rate is greater than or equal to a third preset value, and/or the at least two of the first to N-th row parameters each are greater than or equal to a sixth preset value. Optionally, determine to filter the boundary to-be-filtered when the transformation rate is less than a third preset value and a sum of any two of the first to N-th row parameters is less than a seventh preset value. Optionally, determine not to filter the boundary to-be-filtered when the transformation rate is greater than or equal to a third preset value, and/or a sum of any two of the first to N-th row parameters is greater than or equal to an eighth preset value.

In a specific example, assuming that N=4 and the joint asymptotic feature includes the first row parameter and the fourth row parameter, operations at S508 may include operations at S508-A1 and S508-A2.

At S508-A1, the first row parameter is determined according to a difference between a sample value of a distal sample and a sample value of a center sample in a first row of samples in the first boundary area.

At S508-A2, the fourth row parameter is determined according to a difference between a sample value of a distal sample and a sample value of a center sample in a fourth row of samples in the first boundary area.

For example, as illustrated in FIG. 5A, the center sample in the first row of samples includes: in the first row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the first row of samples includes: in the first row of samples, a third left sample adjacent to the second left sample and a third right sample adjacent to the second right sample.

The center sample in the fourth row of samples includes: in the fourth row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the fourth row of samples includes: in the fourth row of samples, a third left sample adjacent to the second left sample and a third right sample adjacent to the second right sample.

Based on the above, operations at S508-A1 includes operations at A508-A11.

At S508-A11, the first row parameter is determined according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the first row of samples.

For example, the first row parameter is determined according to the following formula:

$$dpq_0 + |2p_{2,0} - p_{1,0} - p_{0,0} + 2q_{2,0} - q_{1,0} - q_{0,0}|,$$

where $dpq_0$ represents the first row parameter, $p_{0,0}$ represents the first left sample in the first row of samples, $p_{1,0}$ represents the second left sample in the first row of samples, $p_{2,0}$ represents the third left sample in the first row of samples, $q_{0,0}$ represents the first right sample in the first row of samples, $q_{1,0}$ represents the second right sample in the first row of samples, $q_{2,0}$ represents the third right sample in the first row of samples.

Operations at S508-A2 includes operations at S508-A21.

At S508-A21, the fourth row parameter is determined according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the fourth row of samples.

For example, the fourth row parameter is determined according to the following formula:

$$dpq_3 = |2p_{2,3} - p_{1,3} - p_{0,3} + 2q_{2,3} - q_{1,3} - q_{0,3}|,$$

where $dpq_3$ represents the fourth row parameter, $p_{0,3}$ represents the first left sample in the fourth row of samples, $p_{1,3}$ represents the second left sample in the fourth row of samples, $p_{2,3}$ represents the third left sample in the fourth row of samples, $q_{0,3}$ represents the first right sample in the fourth row of samples, $q_{1,3}$ represents the second right sample in the fourth row of samples, $q_{2,3}$ represents the third right sample in the fourth row of samples.

After determining the first row parameter and the fourth row parameter, operations at S509 are performed to determine whether to filter the boundary to-be-filtered according to the first row parameter and the fourth row parameter. Operations at S509 are implemented in the following manners.

Manner 1, determine not to filter the boundary to-be-filtered when the first row parameter and the fourth row parameter each are greater than or equal to the second preset value.

Manner 2, determine not to filter the boundary to-be-filtered when a sum of the first row parameter and the fourth row parameter is greater than or equal to the fourth preset value.

Manner 3, a transformation rate of the sample values of samples at two sides of the boundary to-be-filtered is determined according to the sample values of samples at two sides of the boundary to-be-filtered, and whether to filter the boundary to-be-filtered is determined according to the transformation rate and at least one of the first row parameter and the fourth row parameter.

For example, determine to filter the boundary to-be-filtered when the transformation rate is less than the third preset value, and the first row parameter and/or the fourth row parameter each are less than the fifth preset value.

For example, determine to filter the boundary to-be-filtered when the transformation rate is less than the third preset value, and the first row parameter and the fourth row parameter each are greater than or equal to the sixth preset value.

For example, determine to filter the boundary to-be-filtered when the transformation rate is less than the third preset value, and a sum of the first row parameter and the fourth row parameter is less than the seventh preset value.

For example, determine to filter the boundary to-be-filtered when the transformation rate is less than the third preset value, and the sum of the first row parameter and the fourth row parameter is greater than or equal to the eighth preset value.

If it is determined to filter the boundary to-be-filtered, operations at S512 to S514 will be performed. If it is determined not to filter the boundary to-be-filtered, operations at S515 will be performed.

At S510, when the boundary to-be-filtered is a horizontal boundary, a j-th column parameter is determined according to a difference between a sample value of a distal sample and a sample value of a center sample in a j-th column of samples in the second boundary area, where j is an integer greater than or equal to 1 and less than M.

At S511, determine whether to filter the boundary to-be-filtered according to at least one of the first to M-th column parameters.

For example, determine not to filter the boundary to-be-filtered when at least two of the first to M-th column parameters each are greater than or equal to the second preset value. Optionally, determine not to filter the boundary to-be-filtered when a sum of any two of the first to M-th column parameters is greater than or equal to the fourth preset value. Optionally, determine to filter the boundary to-be-filtered when the transformation rate is less than the third preset value and the at least one of the first to M-th column parameters is less than the fifth preset value. Optionally, determine not to filter the boundary to-be-filtered when the transformation rate is greater than or equal to the third preset value, and/or the at least two of the first to M-th column parameters each are greater than or equal to the sixth preset value. Optionally, determine to filter the boundary to-be-filtered when the transformation rate is less than the third preset value and a sum of any two of the first to M-th column parameters is less than the seventh preset value.

In a specific example, assuming that M=4 and the joint asymptotic feature includes the first column parameter and the fourth column parameter, operations at S510 include operations at S510-A1 and S510-A2.

At S510-A1, the first column parameter is determined according to a difference between a sample value of a distal sample and a sample value of a center sample in a first column of samples in the second boundary area.

At S510-A2, the fourth column parameter is determined according to a difference between a sample value of a distal sample and a sample value of a center sample in a fourth column of samples in the second boundary area.

For example, as illustrated in FIG. 5B, the center sample in the first column of samples includes: in the first column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the first column of samples includes: in the first column of samples, a third top sample adjacent to the second top sample and a third bottom sample adjacent to the second bottom sample.

The center sample in the fourth column of samples includes: in the fourth column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the fourth column of samples includes: in the fourth column of samples, a third top sample adjacent to the second top sample and a third bottom sample adjacent to the second bottom sample.

Based on the above, operations at S510-A1 includes operations at A510-A11.

At S510-A11, the first column parameter is determined according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the first column of samples.

For example, the first column parameter is determined according to the following formula:

$$dpq_0 = |2p_{2,0} - p_{1,0} - p_{0,0} + 2q_{2,0} - q_{1,0} - q_{0,0}|,$$

where $dpq_0$ represents the first column parameter, $p_{0,0}$ represents the first top sample in the first column of samples, $p_{1,0}$ represents the second top sample in the first column of samples, $p_{2,0}$ represents the third top sample in the first column of samples, $q_{0,0}$ represents the first bottom sample in the first column of samples, $q_{1,0}$ represents the second bottom sample in the first column of samples, $q_{2,0}$ represents the third bottom sample in the first column of samples.

Operations at S510-A2 includes operations at S510-A21.

At S510-A21, the fourth column parameter is determined parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the fourth column of samples.

For example, the fourth column parameter is determined according to the following formula:

$$dpq_3 = |2p_{2,3} - p_{1,3} - p_{0,3} + 2q_{2,3} - q_{1,3} - q_{0,3}|,$$

where $dpq_3$ represents the fourth column parameter, $p_{0,3}$ represents the first top sample in the fourth column of samples, $p_{1,3}$ represents the second top sample in the fourth column of samples, $p_{2,3}$ represents the third top sample in the fourth column of samples, $q_{0,3}$ represents the first bottom sample in the fourth column of samples, $q_{1,3}$ represents the second bottom sample in the fourth column of samples, $q_{2,3}$ represents the third bottom sample in the fourth column of samples.

After determining the first column parameter and the fourth column parameter, whether to filter the boundary to-be-filtered is determined according to the first column parameter and the fourth column parameter. Operations at S511 are implemented in the following manners.

Manner 1, determine not to filter the boundary to-be-filtered when the first column parameter and the fourth column parameter each are greater than or equal to the second preset value.

Manner 2, determine not to filter the boundary to-be-filtered when a sum of the first column parameter and the fourth column parameter is greater than or equal to the fourth preset value.

Manner 3, a transformation rate of sample values of samples at two sides of the boundary to-be-filtered is determined according to the sample values of samples at two sides of the boundary to-be-filtered, and whether to filter the boundary to-be-filtered is determined according to the transformation rate and at least one of the first column parameter and the fourth column parameter.

For example, determine to filter the boundary to-be-filtered when the transformation rate is less than the third preset value, and the first column parameter and/or the fourth column parameter each are less than the fifth preset value.

For example, determine to filter the boundary to-be-filtered when the transformation rate is less than the third preset value, and the first column parameter and the fourth column parameter each are greater than or equal to the sixth preset value.

For example, determine to filter the boundary to-be-filtered when the transformation rate is less than the third preset value, and a sum of the first column parameter and the fourth column parameter is less than the seventh preset value.

For example, determine to filter the boundary to-be-filtered when the transformation rate is less than the third preset value, and a sum of the first column parameter and the fourth column parameter is greater than or equal to the eighth preset value.

If it is determined to filter the boundary to-be-filtered, operations at S512 to S514 are performed. If it is determined not to filter the boundary to-be-filtered, operations at S515 are performed.

At S512, a filtering method for the boundary to-be-filtered is determined. The filtering method includes strong filtering and weak filtering. Optionally, the filtering method of the boundary to-be-filtered may be determined using methods specified in existing standards.

At S513, the boundary to-be-filtered is filtered using the determined filtering method.

At S514, the reconstructed picture block subjected to filtering is stored in the decoded picture buffer. The video encoder may obtain a reference picture from the decoded picture buffer during subsequent picture encoding processes.

At S515, filtering is stop.

It should be noted that FIG. 6 is only an example and should not be construed as limit to the disclosure.

In a specific example, the filtering process in implementations of the disclosure is described in detail taking N=M=4 as an example. That is, detailed will be given for how to determine whether to filter the reconstructed picture block after the reconstructed picture block is obtained.

Figure 7:
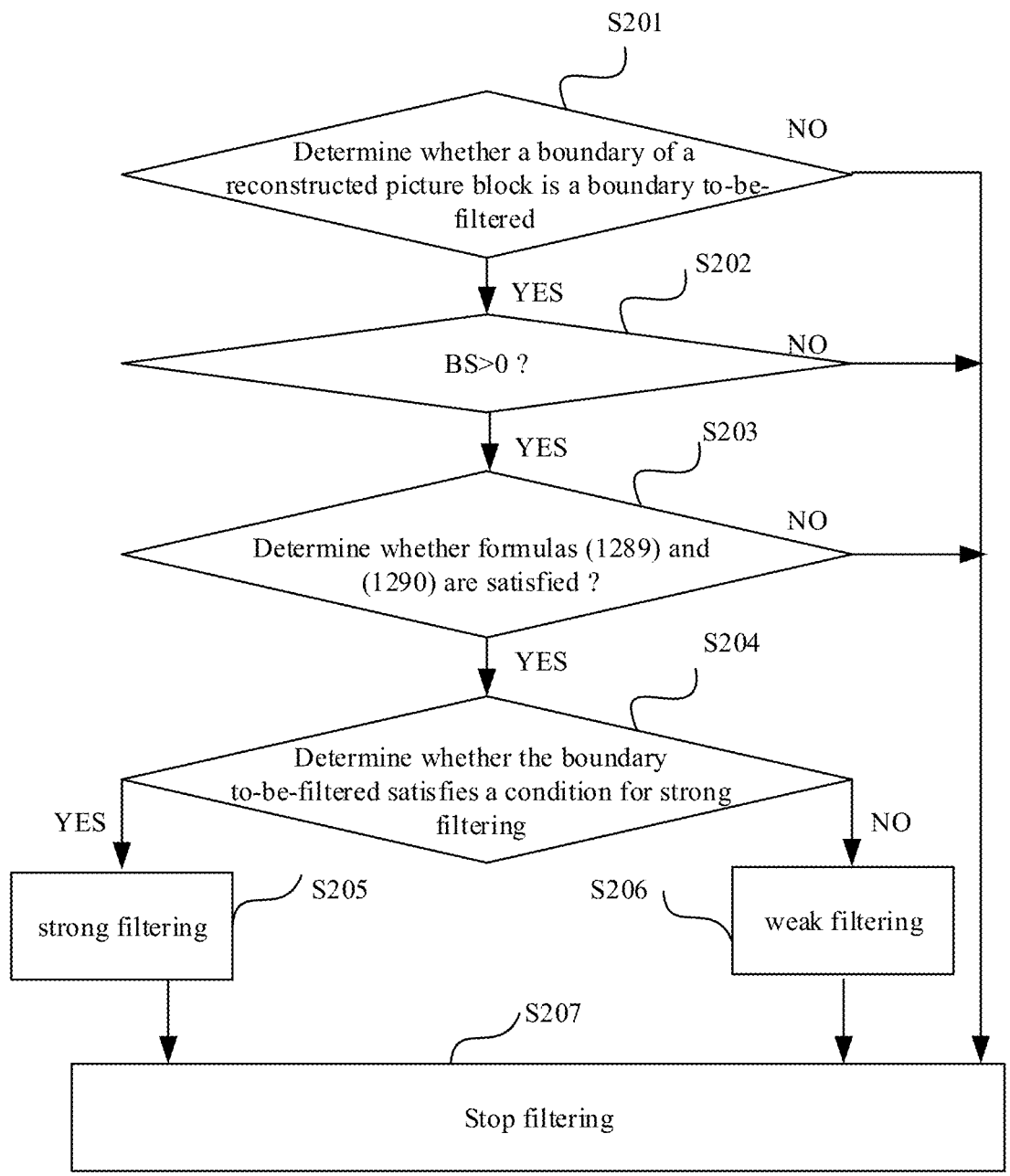
FIG. 7 is a schematic flowchart of a filtering method provided in implementations of the disclosure.

FIG. 7 is a schematic flowchart of a filtering method provided in implementations of the disclosure. As illustrated in FIG. 7, the method includes the following.

At S201, determine whether a boundary of a reconstructed picture block is a boundary to-be-filtered. Reference for this operation may be made to description of 401, which will not be repeated herein. If it is determined that the boundary of the reconstructed picture block is the boundary to-be-filtered, operations at S202 will be performed. If it is determined that the boundary of the reconstructed picture block is not the boundary to-be-filtered, operations at S207 will be performed.

At S202, determine a BS of the boundary to-be-filtered and determine whether the BS is greater than 0. If it is determined that the BS of the boundary to-be-filtered is greater than 0, operations at S203 will be performed. If it is determined that the BS of the boundary to-be-filtered is not greater than 0, operations at S207 will be performed.

At S203, determine whether formulas (1289) and (1290) are satisfied. If both formulas are satisfied, operations at S204 will be performed. Otherwise, operations at S207 will be performed. Specifically, the formulas are as follows:

$$dp_0 = |p_{2,0} + 2p_{1,0} + p_{0,0}| \quad (1285)$$

$$dp_3 = |p_{2,3} + 2p_{1,3} + p_{0,3}| \quad (1286)$$

$$dq_0 = |q_{2,0} + 2q_{1,0} + q_{0,0}| \quad (1287)$$

$$dq_3 = |q_{2,3} + 2q_{1,3} + q_{0,3}| \quad (1288)$$

$$dpq_0 = |2p_{2,0} - p_{1,0} - p_{0,0} + 2q_{2,0} - q_{1,0} - q_{0,0}| \quad (1288\text{-A})$$

$$dpq_3 = |2p_{2,3} - p_{1,3} - p_{0,3} + 2q_{2,3} - q_{1,3} - q_{0,3}| \quad (1288\text{-B})$$

$$dp_0 + dp_3 + dq_0 + dq_3 < \beta \quad (1289)$$

$$dpq_0 < \beta/2 \text{ 或 } dpq_3 < \beta/2 \quad (1288\text{-B})$$

At S204, determine whether the boundary to-be-filtered satisfies a condition for strong filtering. If the boundary to-be-filtered satisfies the condition for strong filtering, operations at S205 will be performed where strong filtering is performed on the boundary to-be-filtered. If the boundary to-be-filtered does not satisfy the condition for strong filtering, operations at S206 will be performed where weak filtering is performed on the boundary to-be-filtered.

At S205, strong filtering is performed.

At S206, weak filtering is performed.

At S207, filtering is ended.

It should be noted that FIG. 7 is only an example and should not be construed as limit to the disclosure.

Some implementations of the present disclosure have been described in detail above in conjunction with the accompanying drawings. However, the present disclosure is not limited to the specific details in the above implementations. Within the scope of the technical concept of the present disclosure, various simple modifications can be made to the technical solutions of the present disclosure. These simple modifications all fall into the protection scope of the present disclosure. For example, the various specific technical features described in the above specific implementations can be combined in any suitable implementations if there is no contradiction. In order to avoid unnecessary repetition, this disclosure will not further describe various possible combinations. As another example, any combination of various implementations of the present disclosure can also be made, and as long as they do not violate the idea of the present disclosure, they should also be regarded as the content disclosed in the present disclosure.

It should also be understood that in the various method implementations of the present disclosure, the sequence numbers of the above-mentioned processes do not mean the order of execution, and the order of execution of the processes should be determined by their functions and internal logic, and should not limit the processes in implementations of this disclosure. In addition, in implementations of the present disclosure, the term "and/or" is only an association relationship describing associated objects, indicating that there may be three relationships. Specifically, A and/or B may mean: A exists alone, A and B exist simultaneously, and B exists alone. In addition, the character "/" in this disclosure generally indicates that the associated objects are in an "or" relationship.

The picture processing method at the encoding side in implementations of the disclosure is described above in detail in combination with FIG. 1 to FIG. 7. In the following, a picture processing method at the decoding side in implementations of the disclosure will be described in combination with FIG. 8 and FIG. 9.

Figure 8:
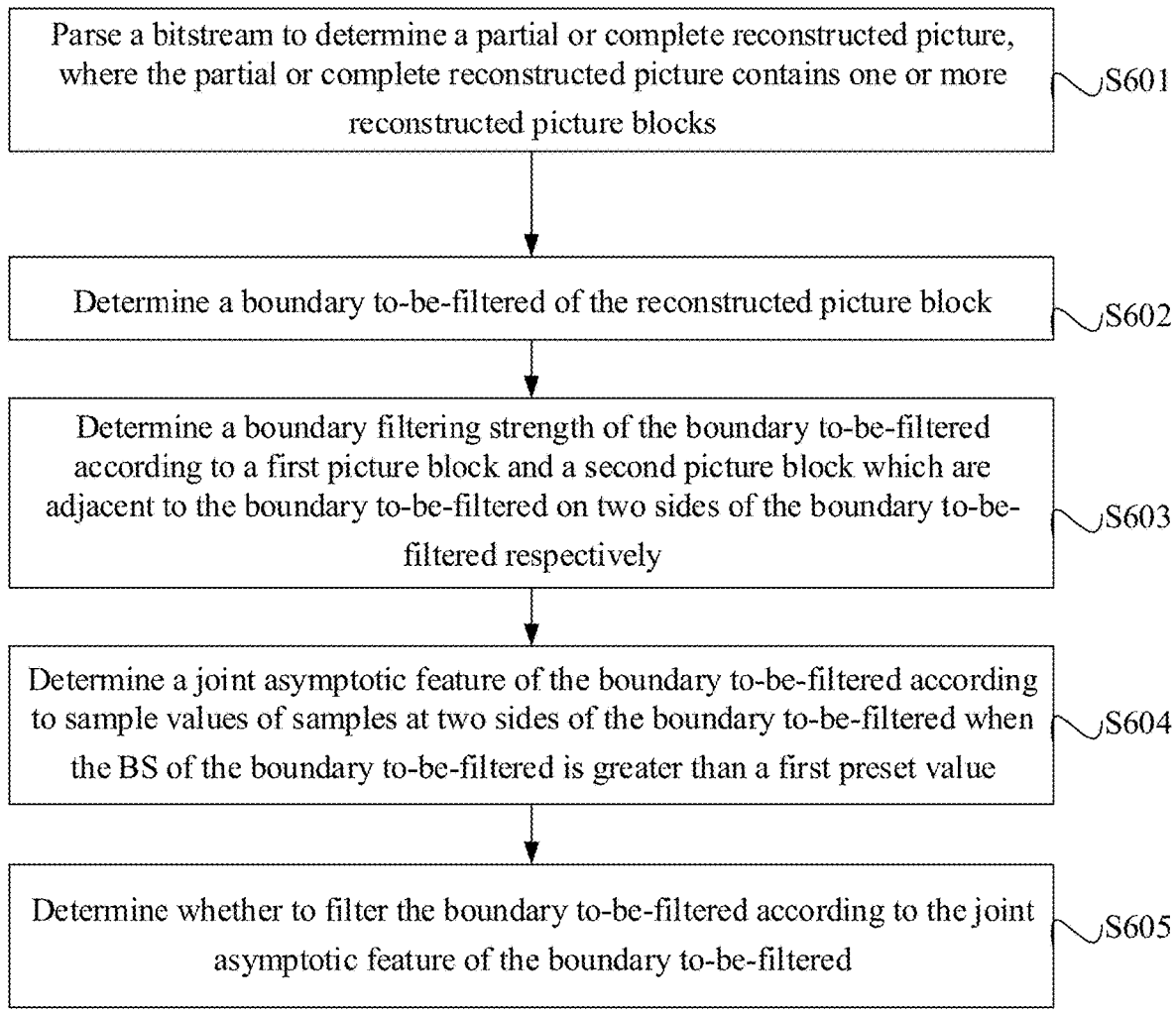
FIG. 8 is a schematic flowchart of a picture processing method 600 provided in implementations of the disclosure.

FIG. 8 is a schematic flowchart of a picture processing method 600 provided in implementations of the disclosure.

The implementations of the disclosure are applied to the video decoder as illustrated in FIG. 1 and FIG. 3. As illustrated in FIG. 8, the method 600 includes the following.

At S601, a bitstream is parsed to determine a partial or complete reconstructed picture, where the partial or complete reconstructed picture contains one or more reconstructed picture blocks.

Specifically, referring to FIG. 3, the header information decoding unit or entropy decoding unit 310 perform entropy decoding on the bitstream to obtain a frequency-domain residual block. The header information decoding unit or entropy decoding unit 310 forwards the frequency-domain residual block to the inverse quantization and transformation unit 330. The inverse quantization and transformation unit 330 performs inverse transformation and inverse quantization on the frequency-domain residual block to obtain the time-domain residual block, and forwards the time-domain residual block to the reconstruction unit 340. The reconstruction unit 340 may be understood as a summator, representing a component that perform the summation. The reconstruction unit 340 adds a prediction block obtained by the prediction unit with the time-domain residual block to obtain the partial or complete reconstructed picture which contains one or more reconstructed picture blocks.

At S602, a boundary to-be-filtered of the reconstructed picture block is determined.

At S603, a boundary filtering strength of the boundary to-be-filtered is determined according to a first picture block and a second picture block which are adjacent to the boundary to-be-filtered on two sides of the boundary to-be-filtered respectively.

Reference for the operations at S602 and S603 may be made to the description of S402 and S403, which will ne be repeated herein.

At S604, a joint asymptotic feature of the boundary to-be-filtered is determined according to sample values of samples at two sides of the boundary to-be-filtered when the BS of the boundary to-be-filtered is greater than a first preset value.

In some implementations, operations at S604 in which the joint asymptotic feature of the boundary to-be-filtered is determined according to the sample values of samples at two sides of the boundary to-be-filtered may include operations at S604-A1.

At S604-A1, the joint asymptotic feature of the boundary to-be-filtered is determined according to a difference between a sample value of a center sample and a sample value of a distal sample in the samples at two sides of the boundary to-be-filtered.

As can be seen from FIG. 5A and FIG. 5B, the boundary to-be-filtered may be a vertical boundary or a horizontal boundary. For different kinds of boundaries, different operations are performed for S604-A1 in which the joint asymptotic feature of the boundary to-be-filtered is determined according to the difference between the sample value of the center sample and the sample value of the distal sample in the samples at two sides of the boundary to-be-filtered. In the following, two case are introduced respectively.

Case 1, when the boundary to-be-filtered is a vertical boundary, the first picture block and the second picture block form a first boundary area containing N rows of samples.

In some implementations, operations at S604-A1 may include operations at S604-A11 and S604-A12.

At S604-A11, an i-th row parameter is determined according to a difference between a sample value of a distal sample and a sample value of a center sample in an i-th row of samples in the first boundary area, where i is a positive integer greater than or equal to 1 and less than N.

At S604-A12, at least one of the first to N-th row parameters is determined as the joint asymptotic feature of the boundary to-be-filtered.

In an example, the center sample in the i-th row of samples includes: in the i-th row of samples, a first left sample (such as $p_{0,i}$) adjacent to the boundary to-be-filtered and a second left sample (such as $p_{1,i}$) adjacent to the first left sample on the left side of the boundary to-be-filtered, and a first right sample (such as $q_{0,i}$) adjacent to the boundary to-be-filtered and a second right sample (such as $q_{1,i}$) adjacent to the first right sample on the right side of the boundary to-be-filtered. The distal sample in the i-th row of samples includes: in the i-th row of samples, a third left sample (such as $p_{2,i}$) adjacent to the second left sample and a third right sample (such as $q_{2,i}$) adjacent to the second right sample.

In this example, operations at S604-A11 may include operations at S604-A111.

At S604-A111, the i-th row parameter is determined according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the i-th row of samples.

For example, the i-th row parameter may be determined according to the above formula (9).

Any of the first to N-th row parameters may be determined in the above manner. Then operations at S404-A12 are performed, where any one of the first to N-th row parameters is determined as the joint asymptotic feature of the boundary to-be-filtered.

For some of specific operations in this example, reference may be made the description of case 1 in S404.

Case 2, when the boundary to-be-filtered is a horizontal boundary, the first picture block and the second picture block form a second boundary area containing M columns of samples.

In this case, operations at S604-A1 may include operations at S604-A14 and S604-A15.

In some implementations, operations at S604-A14 may include the following operations at S604-A14:

At S604-A14, a j-th column parameter is determined according to a difference between a sample value of a distal sample and a sample value of a center sample in a j-th column of samples in the second boundary area, where j is an integer greater than or equal to 1 and less than M.

At S604-A15, at least one of the first to M-th column parameters is determined as the joint asymptotic feature of the boundary to-be-filtered.

In an example, the center sample in the j-th column of samples includes: in the j-th column of samples, a first top sample (such as $p_{0,i}$) adjacent to the boundary to-be-filtered and a second top sample (such as $p_{1,i}$) adjacent to the first top sample on the top of the boundary to-be-filtered, and a first bottom sample (such as $q_{0,i}$) adjacent to the boundary to-be-filtered and a second bottom sample (such as $q_{1,i}$) adjacent to the first bottom sample on the bottom of the boundary to-be-filtered. The distal sample in the j-th column of samples includes: in the j-th column of samples, a third top sample (such as $p_{2,j}$) adjacent to the second top sample and a third bottom sample (such as $q_{2,i}$) adjacent to the second bottom sample.

In this example, operations at S604-A14 may include operations at S404-A141.

At S604-A141, the j-th column parameter is determined according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the j-th column of samples.

For example, the j-th column parameter may be determined according to the above formula (10).

Any of the first to M-th column parameters may be determined in the above manner. Then operations at S604-A15 are performed, where any one of the first to M-th column parameters is determined as the joint asymptotic feature of the boundary to-be-filtered.

It should be noted that specific implementations for operations at S604 are basically the same as that for the operations at S404, so reference may be made to the above and will not be repeated herein.

At S605, whether to filter the boundary to-be-filtered is determined according to the joint asymptotic feature of the boundary to-be-filtered.

When the boundary to-be-filtered is the vertical boundary, operations at S605 may include the following conditions.

In a first condition, determine not to filter the boundary to-be-filtered when at least two parameters of the first to N-th row parameters each are greater than or equal to a second preset value.

In a second condition, determine not to filter the boundary to-be-filtered when a sum of any two of the first to N-th row parameters is greater than or equal to a fourth preset value T4.

In a third condition, a transformation rate of sample values of samples at two sides of the boundary to-be-filtered is determined according to the sample values of samples at two sides of the boundary to-be-filtered, and whether to filter the boundary to-be-filtered is determined according to the transformation rate and at least one of the first to N-th row parameters.

In some implementations of the third condition, determine to filter the boundary to-be-filtered when the transformation rate is less than a third preset value T3 and the at least one of the first to N-th row parameters is less than a fifth preset value T5.

In some implementations of the third condition, determine not to filter the boundary to-be-filtered when the transformation rate is greater than or equal to the third preset value T3, and/or the at least two of the first to N-th row parameters each are greater than or equal to the sixth preset value T6.

In some implementations of the third condition, determine to filter the boundary to-be-filtered when the transformation rate is less than the third preset value T3 and a sum of any two of the first to N-th row parameters is less than a seventh preset value T7.

In some implementations of the third condition, determine not to filter the boundary to-be-filtered when the transformation rate is greater than or equal to the third preset value T3, and/or a sum of any two of the first to N-th row parameters is greater than or equal to an eighth preset value T8.

When the boundary to-be-filtered is the horizontal boundary, operations at S605 may include the following conditions.

In a first condition, determine not to filter the boundary to-be-filtered when at least two of the first to M-th column parameters each are greater than or equal to the second preset value.

In a second condition, determine not to filter the boundary to-be-filtered when a sum of any two of the first to M-th column parameters is greater than or equal to the fourth preset value T4.

In a third condition, a transformation rate of sample values of samples at two sides of the boundary to-be-filtered is determined according to the sample values of samples at two sides of the boundary to-be-filtered, and whether to filter the boundary to-be-filtered is determined according to the transformation rate and at least one of the first to M-th column parameters.

In some implementations of the third condition, determine to filter the boundary to-be-filtered when the transformation rate is less than the third preset value T3 and the at least one of the first to M-th column parameters is less than the fifth preset value T5.

In some implementations of the third condition, determine not to filter the boundary to-be-filtered when the transformation rate is greater than or equal to the third preset value T3, and/or the at least two of the first to M-th column parameters each are greater than or equal to the sixth preset value T6.

In some implementations of the third condition, determine to filter the boundary to-be-filtered when the transformation rate is less than the third preset value T3 and a sum of any two of the first to M-th column parameters is less than the seventh preset value T7.

In some implementations of the third condition, determine not to filter the boundary to-be-filtered when the transformation rate is greater than or equal to the third preset value T3, and/or a sum of any two of the first to M-th column parameters is greater than or equal to the eighth preset value T8.

It should be noted that specific implementations for operations at S605 are basically the same as that for the operations at S405, so reference may be made to the above and will not be repeated herein.

Figure 9:
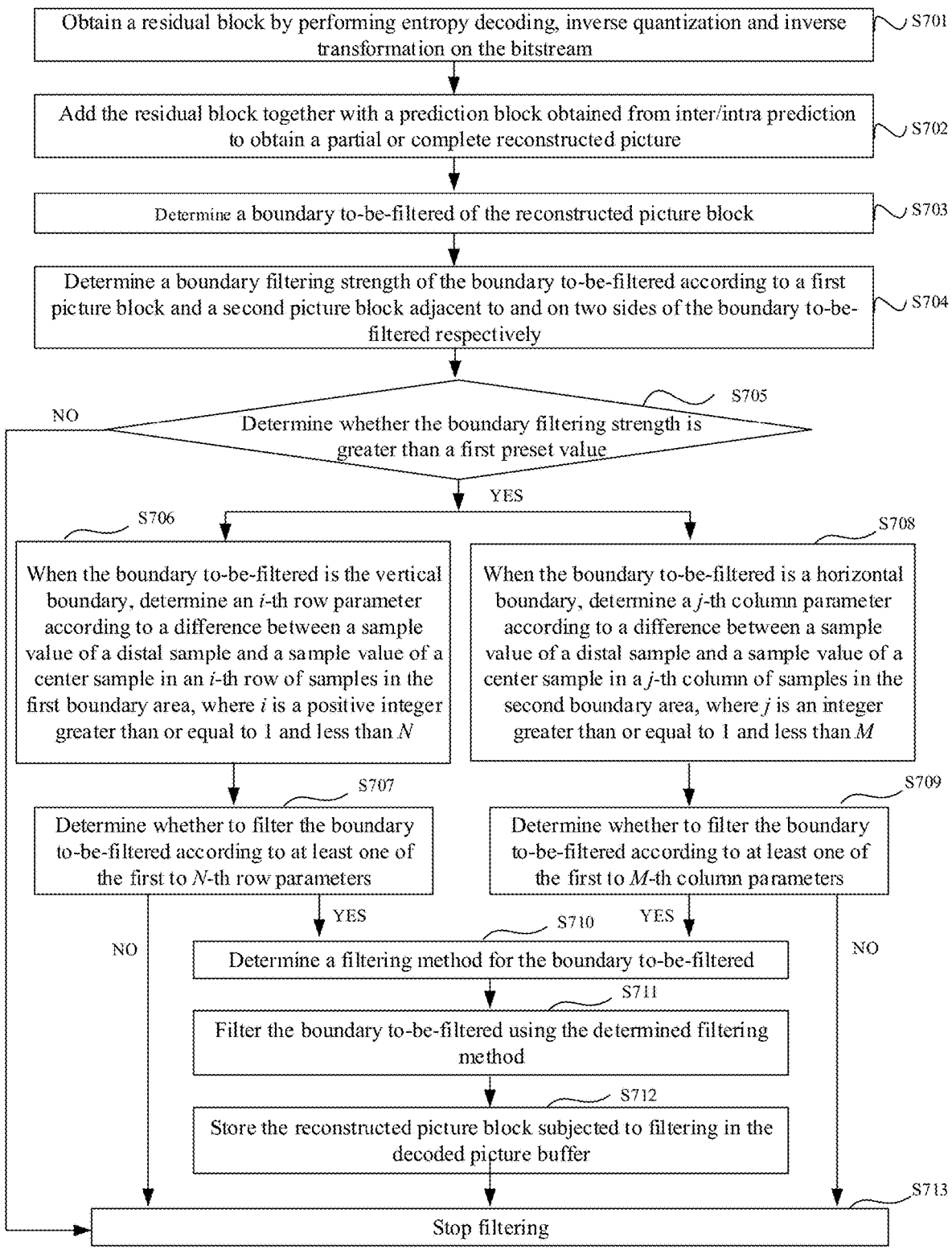
FIG. 9 is a schematic flowchart of a picture processing method 700 provided in implementations of the disclosure.

FIG. 9 is another schematic flowchart of a picture processing method 700 provided in implementations of the disclosure. As illustrated in FIG. 9, the method 700 includes the following.

At S701, a residual block is obtain by performing entropy decoding, inverse quantization and inverse transformation on the bitstream.

At S702, the residual block is added together with a prediction block obtained from inter/intra prediction to obtain a partial or complete reconstructed picture. The partial or complete reconstructed picture includes one or more reconstructed picture blocks.

At S703, a boundary to-be-filtered of the reconstructed picture block is determined. The boundary to-be-filtered may be a horizontal boundary or a vertical boundary. Reference for this operation may be made to description of S402 above, which will not be repeated herein.

At S704, a boundary filtering strength of the boundary to-be-filtered is determined according to a first picture block and a second picture block which are adjacent to the boundary to-be-filtered on two sides of the boundary to-befiltered respectively. Reference for this operation may be made to description of S403 above, which will not be repeated herein.

At S705, determine whether the boundary filtering strength is greater than a first preset value. If the boundary filtering strength is not greater than the first preset value, operations at S713 will be performed. If the boundary filtering strength is greater than the first preset value, operations at S706 and S707 will be performed, or operations at S708 and S709 will be performed.

At S706, when the boundary to-be-filtered is the vertical boundary, an i-th row parameter is determined according to a difference between a sample value of a distal sample and a sample value of a center sample in an i-th row of samples in the first boundary area, where i is a positive integer greater than or equal to 1 and less than N.

At S707, determine whether to filter the boundary to-be-filtered according to at least one of the first to N-th row parameters.

For example, determine not to filter the boundary to-be-filtered when at least two parameters of the first to N-th row parameters each are greater than or equal to a second preset value. Optionally, determine not to filter the boundary to-be-filtered when a sum of any two of the first to N-th row parameters is greater than or equal to a fourth preset value. Optionally, determine to filter the boundary to-be-filtered when the transformation rate is less than a third preset value and the at least one of the first to N-th row parameters is less than a fifth preset value. Optionally, determine not to filter the boundary to-be-filtered when the transformation rate is greater than or equal to a third preset value, and/or the at least two of the first to N-th row parameters each are greater than or equal to a sixth preset value. Optionally, determine to filter the boundary to-be-filtered when the transformation rate is less than a third preset value and a sum of any two of the first to N-th row parameters is less than a seventh preset value. Optionally, determine not to filter the boundary to-be-filtered when the transformation rate is greater than or equal to a third preset value, and/or a sum of any two of the first to N-th row parameters is greater than or equal to an eighth preset value.

In a specific example, assuming that N=4 and the joint asymptotic feature includes the first row parameter and the fourth row parameter, operations at S706 may include operations at S706-A1 and S706-A2.

At S706-A1, the first row parameter is determined according to a difference between a sample value of a distal sample and a sample value of a center sample in a first row of samples in the first boundary area.

At S706-A2, the fourth row parameter is determined according to a difference between a sample value of a distal sample and a sample value of a center sample in a fourth row of samples in the first boundary area.

For example, as illustrated in FIG. 5A, the center sample in the first row of samples includes: in the first row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the first row of samples includes: in the first row of samples, a third left sample adjacent to the second left sample and a third right sample adjacent to the second right sample.

The center sample in the fourth row of samples includes: in the fourth row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the fourth row of samples includes: in the fourth row of samples, a third left sample adjacent to the second left sample and a third right sample adjacent to the second right sample.

Based on the above, operations at S706-A1 includes operations at A706-A11.

At S706-A11, the first row parameter is determined according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the first row of samples.

For example, the first row parameter is determined according to the following formula:

$$dpq_0 = |2p_{2,0} - p_{1,0} - p_{0,0} 2q_{2,0} - q_{1,0} - q_{0,0}|,$$

where $dpq_0$ represents the first row parameter, $p_{0,0}$ represents the first left sample in the first row of samples, $p_{1,0}$ represents the second left sample in the first row of samples, $p_{2,0}$ represents the third left sample in the first row of samples, $q_{0,0}$ represents the first right sample in the first row of samples, $q_{1,0}$ represents the second right sample in the first row of samples, $q_{2,0}$ represents the third right sample in the first row of samples.

Operations at S706-A2 includes operations at S706-A21.

At S706-A21, the fourth row parameter is determined according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the fourth row of samples.

For example, the fourth row parameter is determined according to the following formula:

$$dpq_3 = |2p_{2,3} - p_{1,3} - p_{0,3} + 2q_{2,3} - q_{1,3} - q_{0,3}|,$$

where $dpq_3$ represents the fourth row parameter, $p_{0,3}$ represents the first left sample in the fourth row of samples, $p_{1,3}$ represents the second left sample in the fourth row of samples, $p_{2,3}$ represents the third left sample in the fourth row of samples, $q_{0,3}$ represents the first right sample in the fourth row of samples, $q_{1,3}$ represents the second right sample in the fourth row of samples, $q_{2,3}$ represents the third right sample in the fourth row of samples.

After determining the first row parameter and the fourth row parameter, determine whether to filter the boundary to-be-filtered according to the first row parameter and the fourth row parameter. Operations at S707 are implemented in the following manners.

Manner 1, determine not to filter the boundary to-be-filtered when the first row parameter and the fourth row parameter each are greater than or equal to the second preset value.

Manner 2, determine not to filter the boundary to-be-filtered when a sum of the first row parameter and the fourth row parameter is greater than or equal to the fourth preset value.

Manner 3, a transformation rate of the sample values of samples at two sides of the boundary to-be-filtered is determined according to the sample values of samples at two sides of the boundary to-be-filtered, and whether to filter the boundary to-be-filtered is determined according to the transformation rate and at least one of the first row parameter and the fourth row parameter.

For example, determine to filter the boundary to-be-filtered when the transformation rate is less than the third preset value, and the first row parameter and/or the fourth row parameter each are less than the fifth preset value.

For example, determine to filter the boundary to-be-filtered when the transformation rate is less than the third preset value, and the first row parameter and the fourth row parameter each are greater than or equal to the sixth preset value.

For example, determine to filter the boundary to-be-filtered when the transformation rate is less than the third preset value, and a sum of the first row parameter and the fourth row parameter is less than the seventh preset value.

For example, determine to filter the boundary to-be-filtered when the transformation rate is less than the third preset value, and the sum of the first row parameter and the fourth row parameter is greater than or equal to the eighth preset value.

If it is determined to filter the boundary to-be-filtered, operations at S710 to S712 will be performed. If it is determined not to filter the boundary to-be-filtered, operations at S713 will be performed.

At S708, when the boundary to-be-filtered is a horizontal boundary, a j-th column parameter is determined according to a difference between a sample value of a distal sample and a sample value of a center sample in a j-th column of samples in the second boundary area, where j is an integer greater than or equal to 1 and less than M.

At S709, determine whether to filter the boundary to-be-filtered according to at least one of the first to M-th column parameters.

For example, determine not to filter the boundary to-be-filtered when at least two of the first to M-th column parameters each are greater than or equal to the second preset value. Optionally, determine not to filter the boundary to-be-filtered when a sum of any two of the first to M-th column parameters is greater than or equal to the fourth preset value. Optionally, determine to filter the boundary to-be-filtered when the transformation rate is less than the third preset value and the at least one of the first to M-th column parameters is less than the fifth preset value. Optionally, determine not to filter the boundary to-be-filtered when the transformation rate is greater than or equal to the third preset value, and/or the at least two of the first to M-th column parameters each are greater than or equal to the sixth preset value. Optionally, determine to filter the boundary to-be-filtered when the transformation rate is less than the third preset value and a sum of any two of the first to M-th column parameters is less than the seventh preset value.

In a specific example, assuming that M=4 and the joint asymptotic feature includes the first column parameter and the fourth column parameter, operations at S708 include operations at S708-A1 and S708-A2.

At S708-A1, the first column parameter is determined according to a difference between a sample value of a distal sample and a sample value of a center sample in a first column of samples in the second boundary area.

At S708-A2, the fourth column parameter is determined according to a difference between a sample value of a distal sample and a sample value of a center sample in a fourth column of samples in the second boundary area.

For example, as illustrated in FIG. 5B, the center sample in the first column of samples includes: in the first column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the first column of samples includes: in the first column of samples, a third top sample adjacent to the second top sample and a third bottom sample adjacent to the second bottom sample.

The center sample in the fourth column of samples includes: in the fourth column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the fourth column of samples includes: in the fourth column of samples, a third top sample adjacent to the second top sample and a third bottom sample adjacent to the second bottom sample.

Based on the above, operations at S708-A1 includes operations at A708-A11.

At S708-A11, the first column parameter is determined according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the first column of samples.

For example, the first column parameter is determined according to the following formula:

$$dpq_0 = |2p_{2,0} - p_{1,0} - p_{0,0} + 2q_{2,0} - q_{1,0} - q_{0,0}|,$$

where $dpq_0$ represents the first column parameter, $p_{0,0}$ represents the first top sample in the first column of samples, $p_{1,0}$ represents the second top sample in the first column of samples, $p_{2,0}$ represents the third top sample in the first column of samples, $q_{0,0}$ represents the first bottom sample in the first column of samples, $q_{1,0}$ represents the second bottom sample in the first column of samples, $q_{2,0}$ represents the third bottom sample in the first column of samples.

Operations at S708-A2 includes operations at S708-A21.

At S708-A21, the fourth column parameter is determined parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the fourth column of samples.

For example, the fourth column parameter is determined according to the following formula:

$$dpq_3 = |2p_{2,3} - p_{1,3} - p_{0,3} + 2q_{2,3} - q_{1,3} - q_{0,3}|,$$

where $dpq_3$ represents the fourth column parameter, $p_{0,3}$ represents the first top sample in the fourth column of samples, $p_{1,3}$ represents the second top sample in the fourth column of samples, $p_{2,3}$ represents the third top sample in the fourth column of samples, $q_{0,3}$ represents the first bottom sample in the fourth column of samples, $q_{1,3}$ represents the second bottom sample in the fourth column of samples, $q_{2,3}$ represents the third bottom sample in the fourth column of samples.

After determining the first column parameter and the fourth column parameter, whether to filter the boundary to-be-filtered is determined according to the first column parameter and the fourth column parameter. Operations at S709 are implemented in the following manners.

Manner 1, determine not to filter the boundary to-be-filtered when the first column parameter and the fourth column parameter each are greater than or equal to the second preset value.

Manner 2, determine not to filter the boundary to-be-filtered when a sum of the first column parameter and the fourth column parameter is greater than or equal to the fourth preset value.

Manner 3, a transformation rate of sample values of samples at two sides of the boundary to-be-filtered is determined according to the sample values of samples at two sides of the boundary to-be-filtered, and whether to filter the boundary to-be-filtered is determined according to the transformation rate and at least one of the first column parameter and the fourth column parameter.

For example, determine to filter the boundary to-be-filtered when the transformation rate is less than the third preset value, and the first column parameter and/or the fourth column parameter each are less than the fifth preset value.

For example, determine to filter the boundary to-be-filtered when the transformation rate is less than the third preset value, and the first column parameter and the fourth column parameter each are greater than or equal to the sixth preset value.

For example, determine to filter the boundary to-be-filtered when the transformation rate is less than the third preset value, and a sum of the first column parameter and the fourth column parameter is less than the seventh preset value.

For example, determine to filter the boundary to-be-filtered when the transformation rate is less than the third preset value, and a sum of the first column parameter and the fourth column parameter is greater than or equal to the eighth preset value.

If it is determined to filter the boundary to-be-filtered, operations at S710 to S712 are performed. If it is determined not to filter the boundary to-be-filtered, operations at S713 are performed.

At S710, a filtering method for the boundary to-be-filtered is determined. The filtering method includes strong filtering and weak filtering.

At S711, the boundary to-be-filtered is filtered using the determined filtering method. Optionally, the filtering method of the boundary to-be-filtered may be determined using methods specified in existing standards.

At S712, the reconstructed picture block subjected to filtering is stored in the decoded picture buffer. The video decoder may obtain the reconstructed picture block subjected to filtering as a reference picture from the decoded picture buffer, or transmit the reconstructed picture block subjected to filtering to the display device for display.

At S713, filtering is stop.

It should be noted that FIG. 9 is only an example and should not be construed as limit to the disclosure.

The method implementations in the disclosure are described in detail above in combination with FIG. 1 to FIG. 9. In the following, device implementations in the disclosure will be described in detail in combination with FIG. 10 and FIG. 12.

Figure 10:
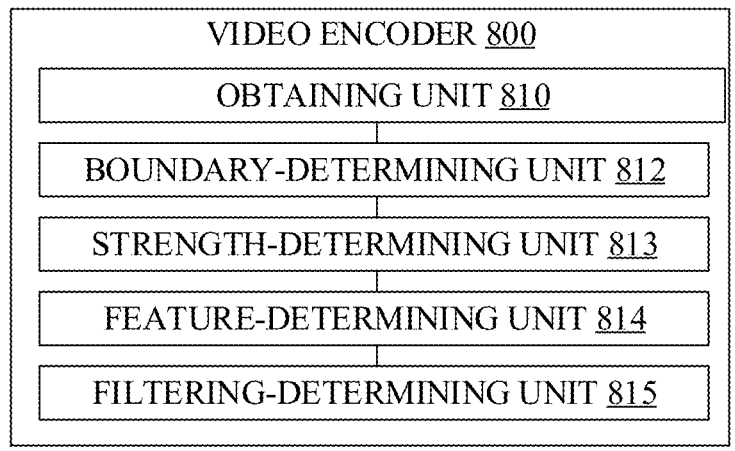
FIG. 10 is a schematic block diagram of a video encoder 800 provided in implementations of the disclosure.

FIG. 10 is a schematic block diagram of a video encoder 800 provided in implementations of the disclosure.

As illustrated in FIG. 10, the video encoder 800 includes an obtaining unit 810, a boundary-determining unit 812, a strength-determining unit 813, a feature-determining unit 814, and a filter-determining unit 815.

The obtaining unit 810 is configured to obtain a partial or complete reconstructed picture of a picture to-be-encoded, the partial or complete reconstructed picture containing one or more reconstructed picture blocks.

The boundary-determining unit 812 is configured to determine a boundary to-be-filtered of the reconstructed picture block.

The strength-determining unit 813 is configured to determine a boundary filtering strength of the boundary to-be-filtered according to encoding information of a first picture block and a second picture block which are adjacent to the boundary to-be-filtered on two sides of the boundary to-be-filtered respectively.

The feature-determining unit 814 is configured to determine a joint asymptotic feature of the boundary to-be-filtered according to sample values of samples at two sides of the boundary to-be-filtered when the boundary filtering strength of the boundary to-be-filtered is greater than a first preset value. Optionally, the first preset value is 0.

The filter-determining unit 815 is configured to determine whether to filter the boundary to-be-filtered according to the joint asymptotic feature of the boundary to-be-filtered.

In some implementations, the feature-determining unit 814 is specifically configured to determine the joint asymptotic feature of the boundary to-be-filtered according to a difference between a sample value of a center sample and a sample value of a distal sample in the samples at two sides of the boundary to-be-filtered, where the center sample is adjacent to the boundary to-be-filtered, and the distal sample is adjacent to the center sample.

When the boundary to-be-filtered is a vertical boundary, the first picture block and the second picture block form a first boundary area containing N rows of samples. The feature-determining unit 814 is specifically configured to determine an i-th row parameter according to a difference between a sample value of a distal sample and a sample value of a center sample in an i-th row of samples in the first boundary area, and determine at least one of the first to N-th row parameters as the joint asymptotic feature, where N is a positive integer and i is an integer greater than or equal to 1 and less than N.

In a possible implementation, the center sample in the i-th row of samples includes: in the i-th row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered.

The distal sample in the i-th row of samples includes: in the i-th row of samples, a third left sample adjacent to the second left sample and a third right sample adjacent to the second right sample.

Based on this possible implementation, the feature-determining unit 814 is specifically configured to determine the i-th row parameter according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the i-th row of samples.

For example, the feature-determining unit 814 is specifically configured to determine the i-th row parameter according to a formula:

$$dpq_i = |2p_{2,i} - p_{1,i} - p_{0,i} + 2q_{2,i} - q_{1,i} - q_{0,i}|,$$

where $dpq_i$ represents the i-th row parameter, $p_{0,i}$ represents the first left sample in the i-th row of samples, $p_{1,i}$ represents the second left sample in the i-th row of samples, $p_{2,i}$ represents the third left sample in the i-th row of samples, $q_{0,i}$ represents the first right sample in the i-th row of samples, $q_{1,i}$ represents the second right sample in the i-th row of samples, $q_{2,i}$ represents the third right sample in the i-th row of samples.

In some implementations, the filtering-determining unit 815 is specifically configured to determine not to filter the boundary to-be-filtered when at least two parameters of the first to N-th row parameters each are greater than or equal to a second preset value.

Optionally, the second preset value is greater than 0.5 and less than 1.

Optionally, the second preset value is greater than 0.5 and less than 0.8.

Optionally, the second preset value is half of a third preset value.

Optionally, the filtering-determining unit 815 is further configured to determine the second preset value according to a c.

In some implementations, the filtering-determining unit 815 is specifically configured to determine not to filter the boundary to-be-filtered when a sum of any two of the first to N-th row parameters is greater than or equal to a fourth preset value.

In some implementations, the filtering-determining unit 815 is specifically configured to determine a transformation rate of sample values of samples at two sides of the boundary to-be-filtered according to the sample values of samples at two sides of the boundary to-be-filtered, and determine whether to filter the boundary to-be-filtered according to the transformation rate and at least one of the first to N-th row parameters.

In some implementations, the filtering-determining unit 815 is specifically configured to determine to filter the boundary to-be-filtered when the transformation rate is less than a third preset value and the at least one of the first to N-th row parameters is less than a fifth preset value.

In some implementations, the filtering-determining unit 815 is specifically configured to determine not to filter the boundary to-be-filtered when the transformation rate is greater than or equal to the third preset value, and/or the at least two of the first to N-th row parameters each are greater than or equal to the sixth preset value.

In some implementations, the filtering-determining unit 815 is specifically configured to determine to filter the boundary to-be-filtered when the transformation rate is less than the third preset value and a sum of any two of the first to N-th row parameters is less than a seventh preset value.

In some implementations, the filtering-determining unit 815 is specifically configured to determine not to filter the boundary to-be-filtered when the transformation rate is greater than or equal to the third preset value, and/or a sum of any two of the first to N-th row parameters is greater than or equal to an eighth preset value.

In a specific example, assuming that N=4 and the joint asymptotic feature includes the first row parameter and the fourth row parameter, the feature-determining unit 814 is specifically configured to determine the first row parameter according to a difference between a sample value of a distal sample and a sample value of a center sample in a first row of samples in the first boundary area, and determine the fourth row parameter according to a difference between a sample value of a distal sample and a sample value of a center sample in a fourth row of samples in the first boundary area.

For example, the center sample in the first row of samples includes: in the first row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the first row of samples includes: in the first row of samples, a third left sample adjacent to the second left sample and a third right sample adjacent to the second right sample.

The center sample in the fourth row of samples includes: in the fourth row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the fourth row of samples includes: in the fourth row of samples, a third left sample adjacent to the second left sample and a third right sample adjacent to the second right sample.

In this example, the feature-determining unit 814 is specifically configured to determine the first row parameter according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the first row of samples.

For example, the feature-determining unit 814 is specifically configured to determine the first row parameter according to the following formula:

$$dpq_0 = |2p_{2,0} - p_{1,0} - p_{0,0} + 2q_{2,0} - q_{1,0} - q_{0,0}|,$$

where $dpq_0$ represents the first row parameter, $p_{0,0}$ represents the first left sample in the first row of samples, $p_{1,0}$ represents the second left sample in the first row of samples, $p_{2,0}$ represents the third left sample in the first row of samples, $q_{0,0}$ represents the first right sample in the first row of samples, $q_{1,0}$ represents the second right sample in the first row of samples, $q_{2,0}$ represents the third right sample in the first row of samples.

Further, the feature-determining unit 814 is specifically configured to determine the fourth row parameter according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the fourth row of samples.

For example, the feature-determining unit 814 is specifically configured to determine the fourth row parameter according to the following formula:

$$dpq_3 = |2p_{2,3} - p_{1,3} - p_{0,3} + 2q_{2,3} - q_{1,3} - q_{0,3}|,$$

where $dpq_3$ represents the fourth row parameter, $p_{0,3}$ represents the first left sample in the fourth row of samples, $p_{1,3}$ represents the second left sample in the fourth row of samples, $p_{2,3}$ represents the third left sample in the fourth row of samples, $q_{0,3}$ represents the first right sample in the fourth row of samples, $q_{1,3}$ represents the second right sample in the fourth row of samples, $q_{2,3}$ represents the third right sample in the fourth row of samples.

Correspondingly, the filtering-determining unit 815 is specifically configured to:

determine not to filter the boundary to-be-filtered when the first row parameter and the fourth row parameter each are greater than or equal to the second preset value; or determine not to filter the boundary to-be-filtered when a sum of the first row parameter and the fourth row parameter is greater than or equal to the fourth preset value; or determine a transformation rate of the sample values of samples at two sides of the boundary to-be-filtered according to the sample values of samples at two sides of the boundary to-be-filtered, and determine whether to filter the boundary to-be-filtered according to the transformation rate and at least one of the first row parameter and the fourth row parameter.

For example, determine to filter the boundary to-be-filtered when the transformation rate is less than the third preset value, and the first row parameter and/or the fourth row parameter each are less than the fifth preset value.

For example, determine to filter the boundary to-be-filtered when the transformation rate is less than the third preset value, and the first row parameter and the fourth row parameter each are greater than or equal to the sixth preset value.

For example, determine to filter the boundary to-be-filtered when the transformation rate is less than the third preset value, and a sum of the first row parameter and the fourth row parameter is less than the seventh preset value.

For example, determine to filter the boundary to-be-filtered when the transformation rate is less than the third preset value, and the sum of the first row parameter and the fourth row parameter is greater than or equal to the eighth preset value.

When the boundary to-be-filtered is a horizontal boundary, the first picture block and the second picture block form a second boundary area containing M columns of samples. The feature-determining unit 814 is specifically configured to determine a j-th column parameter according to a difference between a sample value of a distal sample and a sample value of a center sample in a j-th column of samples in the second boundary area, and determine at least one of the first to M-th column parameters as the joint asymptotic feature, where M is a positive integer and j is an integer greater than or equal to 1 and less than M.

In a possible implementation, the center sample in the j-th column of samples includes: in the j-th column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered.

The distal sample in the j-th column of samples includes: in the j-th column of samples, a third top sample adjacent to the second top sample and a third bottom sample adjacent to the second bottom sample.

Based on this possible implementation, the feature-determining unit 814 is specifically configured to determine the j-th column parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the j-th column of samples.

For example, the feature-determining unit 814 is specifically configured to determining the j-th column parameter according to a formula:

$$dpq_j = |2p_{2,j} - p_{1,j} - p_{0,j} + 2q_{2,j} - q_{1,j} - q_{0,j}|,$$

where $dpq_j$ represents the j-th column parameter, $p_{0,j}$ represents the first top sample in the j-th column of samples, $p_{1,j}$ represents the second top sample in the j-th column of samples, $p_{2,j}$ represents the third top sample in the j-th column of samples, $q_{0,j}$ represents the first bottom sample in the j-th column of samples, $q_{1,j}$ represents the second bottom sample in the j-th column of samples, $q_{2,j}$ represents the third bottom sample in the j-th column of samples.

In some implementations, the filtering-determining unit 815 is specifically configured to determine not to filter the boundary to-be-filtered when the at least two of the first to M-th column parameters each are greater than or equal to a second preset value.

Optionally, the second preset value is greater than 0.5 and less than 1.

Optionally, the second preset value is greater than 0.5 and less than 0.8.

Optionally, the second preset value is half of a third preset value.

Optionally, the filtering-determining unit 815 is specifically configured to determine the second preset value according to a quantization parameter (QP).

In some implementations, the filtering-determining unit 815 is specifically configured to determine not to filter the boundary to-be-filtered when a sum of any two of the first to M-th column parameters is greater than or equal to a fourth preset value.

In some implementations, the filtering-determining unit 815 is specifically configured to determine a transformation rate of sample values of samples at two sides of the boundary to-be-filtered according to the sample values of samples at two sides of the boundary to-be-filtered, and determine whether to filter the boundary to-be-filtered according to the transformation rate and at least one of the first to M-th column parameters.

In some implementations, the filtering-determining unit 815 is specifically configured to determine to filter the boundary to-be-filtered when the transformation rate is less than a third preset value and the at least one of the first to M-th column parameters is less than a fifth preset value.

In some implementations, the filtering-determining unit 815 is specifically configured to determine not to filter the boundary to-be-filtered when the transformation rate is greater than or equal to a third preset value, and/or the at least two of the first to M-th column parameters each are greater than or equal to a sixth preset value.

In some implementations, the filtering-determining unit 815 is specifically configured to determine to filter the boundary to-be-filtered when the transformation rate is less than a third preset value and a sum of any two of the first to M-th column parameters is less than a seventh preset value.

In some implementations, the filtering-determining unit 815 is specifically configured to determine not to filter the boundary to-be-filtered when the transformation rate is greater than or equal to a third preset value, and/or a sum of any two of the first to M-th column parameters is greater than or equal to an eighth preset value.

In a specific example, assuming that M=4 and the joint asymptotic feature includes the first column parameter and the fourth column parameter, the feature-determining unit 814 is specifically configured to determine the first column parameter according to a difference between a sample value of a distal sample and a sample value of a center sample in a first column of samples in the second boundary area, and determine the fourth column parameter according to a difference between a sample value of a distal sample and a sample value of a center sample in a fourth column of samples in the second boundary area.

For example, the center sample in the first column of samples includes: in the first column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the first column of samples includes: in the first column of samples, a third top sample adjacent to the second top sample and a third bottom sample adjacent to the second bottom sample.

The center sample in the fourth column of samples includes: in the fourth column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the fourth column of samples includes: in the fourth column of samples, a third top sample adjacent to the second top sample and a third bottom sample adjacent to the second bottom sample.

In this case, the feature-determining unit 814 is specifically configured to determine the first column parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the first column of samples.

For example, the feature-determining unit 814 is specifically configured to determine the first column parameter according to a formula:

$$dpq_0 = |2p_{2,0} - p_{1,0} - p_{0,0} + 2q_{2,0} - q_{1,0} - q_{0,0}|,$$

where $dpq_0$ represents the first column parameter, $p_{0,0}$ represents the first top sample in the first column of samples, $p_{1,0}$ represents the second top sample in the first column of samples, $p_{2,0}$ represents the third top sample in the first column of samples, $q_{0,0}$ represents the first bottom sample in the first column of samples, $q_{1,0}$ represents the second bottom sample in the first column of samples, $q_{2,0}$ represents the third bottom sample in the first column of samples.

Further, the feature-determining unit 814 is specifically configured to determine the fourth column parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the fourth column of samples.

For example, the feature-determining unit 814 is specifically configured to determine the fourth column parameter according to a formula:

$$dpq_3 = |2p_{2,3} - p_{1,3} - p_{0,3} + 2q_{2,3} - q_{1,3} - q_{0,3}|,$$

where $dpq_3$ represents the fourth column parameter, $p_{0,3}$ represents the first top sample in the fourth column of samples, $p_{1,3}$ represents the second top sample in the fourth column of samples, $p_{2,3}$ represents the third top sample in the fourth column of samples, $q_{0,3}$ represents the first bottom sample in the fourth column of samples, $q_{1,3}$ represents the second bottom sample in the fourth column of samples, $q_{2,3}$ represents the third bottom sample in the fourth column of samples.

Correspondingly, the filtering-determining unit 815 is specifically configured to:
determine not to filter the boundary to-be-filtered when the first column parameter and the fourth column parameter each are greater than or equal to a second preset value; or
determine not to filter the boundary to-be-filtered when a sum of the first column parameter and the fourth column parameter is greater than or equal to a fourth preset value; or
determine a transformation rate of sample values of samples at two sides of the boundary to-be-filtered according to the sample values of samples at two sides of the boundary to-be-filtered, and determine whether to filter the boundary to-be-filtered according to the transformation rate and at least one of the first column parameter and the fourth column parameter.

For example, determine to filter the boundary to-be-filtered when the transformation rate is less than a third preset value, and the first column parameter and/or the fourth column parameter each are less than a fifth preset value.

For example, determine to filter the boundary to-be-filtered when the transformation rate is less than a third preset value, and the first column parameter and the fourth column parameter each are greater than or equal to a sixth preset value.

For example, determine to filter the boundary to-be-filtered when the transformation rate is less than a third preset value, and a sum of the first column parameter and the fourth column parameter is less than a seventh preset value.

For example, determine to filter the boundary to-be-filtered when the transformation rate is less than a third preset value, and a sum of the first column parameter and the fourth column parameter is greater than or equal to an eighth preset value.

It should be noted that the device implementations may be corresponding to the method implementations, and similar descriptions made be made to the method implementations, which will be repeated herein. Specifically, the video encoder 800 illustrated in FIG. 10 may perform the method in implementations of the disclosure. The aforementioned and other operations and/or functions of each unit in the video encoder 800 are respectively intended to implement corresponding processes in each method such as method 400 or 500, and for the sake of brevity, details are not repeated here.

Figure 11:
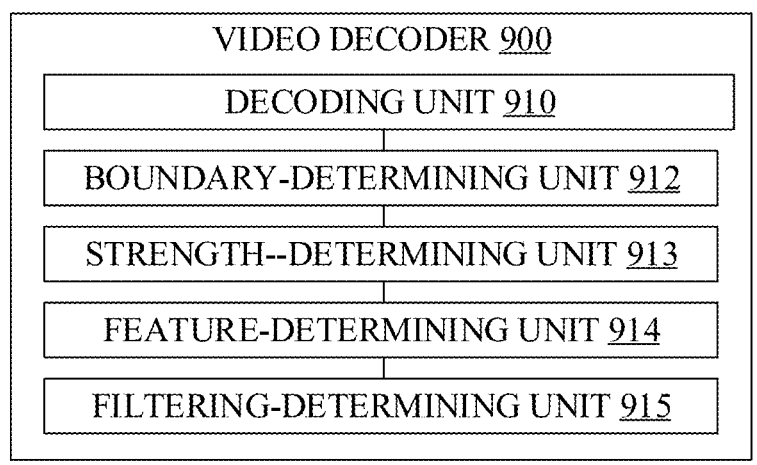
FIG. 11 is a schematic block diagram of a video decoder 900 provided in implementations of the disclosure.

FIG. 11 is a schematic block diagram of a video decoder 900 provided in implementations of the disclosure.

As illustrated in FIG. 11, the video decoder 900 may include a decoding unit 910, a boundary-determining unit 912, a strength-determining unit 913, a feature-determining unit 914, and a filter-determining unit 915.

The decoding unit 910 is configured to parse a bitstream to determine a partial or complete reconstructed picture, where the partial or complete reconstructed picture contains one or more reconstructed picture blocks.

The boundary-determining unit 912 is configured to determine a boundary to-be-filtered of the reconstructed picture block.

The strength-determining unit 913 is configured to determine a boundary filtering strength of the boundary to-be-filtered according to a first picture block and a second picture block which are adjacent to the boundary to-be-filtered on two sides of the boundary to-be-filtered respectively.

The feature-determining unit 914 is configured to determine a joint asymptotic feature of the boundary to-be-filtered according to sample values of samples at two sides of the boundary to-be-filtered when the boundary filtering strength of the boundary to-be-filtered is greater than a first preset value. For example, the first preset value is 0.

The filter-determining unit 915 is configured to determine whether to filter the boundary to-be-filtered according to the joint asymptotic feature of the boundary to-be-filtered.

In some implementations, the feature-determining unit 914 is specifically configured to determine the joint asymptotic feature of the boundary to-be-filtered according to a difference between a sample value of a center sample and a sample value of a distal sample in the samples at two sides of the boundary to-be-filtered, where the center sample is adjacent to the boundary to-be-filtered, and the distal sample is adjacent to the center sample.

When the boundary to-be-filtered is a vertical boundary, the first picture block and the second picture block form a first boundary area containing N rows of samples. The feature-determining unit 914 is specifically configured to determine an i-th row parameter according to a difference between a sample value of a distal sample and a sample value of a center sample in an i-th row of samples in the first boundary area, and determine at least one of the first to N-th row parameters as the joint asymptotic feature, where N is a positive integer and i is an integer greater than or equal to 1 and less than N.

In some implementations, the center sample in the i-th row of samples includes: in the i-th row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered.

The distal sample in the i-th row of samples includes: in the i-th row of samples, a third left sample adjacent to the second left sample and a third right sample adjacent to the second right sample.

In some implementations, the feature-determining unit 914 is specifically configured to determine the i-th row parameter according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the i-th row of samples.

For example, the feature-determining unit 914 is specifically configured to determine the i-th row parameter according to a formula:

$$dpq_i = |2p_{2,i} - p_{1,i} - p_{0,i} + 2q_{2,i} - q_{1,i} - q_{0,i}|,$$

where $dpq_i$ represents the i-th row parameter, $p_{0,i}$ represents the first left sample in the i-th row of samples, $p_{1,i}$ represents the second left sample in the i-th row of samples, $p_{2,i}$ represents the third left sample in the i-th row of samples, $q_{0,i}$ represents the first right sample in the i-th row of samples, $q_{1,i}$ represents the second right sample in the i-th row of samples, $q_{2,i}$ represents the third right sample in the i-th row of samples.

In some implementations, the filtering-determining unit 915 is specifically configured to determine not to filter the boundary to-be-filtered when at least two parameters of the first to N-th row parameters each are greater than or equal to a second preset value.

Optionally, the second preset value is greater than 0.5 and less than 1.

Optionally, the second preset value is greater than 0.5 and less than 0.8.

Optionally, the second preset value is half of a third preset value.

Optionally, the filtering-determining unit 915 is specifically configured to determine the second preset value according to a quantization parameter (QP).

In some implementations, the filtering-determining unit 915 is specifically configured to determine not to filter the boundary to-be-filtered when a sum of any two of the first to N-th row parameters is greater than or equal to a fourth preset value.

In some implementations, the filtering-determining unit 915 is specifically configured to determine a transformation rate of sample values of samples at two sides of the boundary to-be-filtered according to the sample values of samples at two sides of the boundary to-be-filtered, and determine whether to filter the boundary to-be-filtered according to the transformation rate and at least one of the first to N-th row parameters.

In some implementations, the filtering-determining unit 915 is specifically configured to determine to filter the boundary to-be-filtered when the transformation rate is less than a third preset value and the at least one of the first to N-th row parameters is less than a fifth preset value.

In some implementations, the filtering-determining unit 915 is specifically configured to determine not to filter the boundary to-be-filtered when the transformation rate is greater than or equal to the third preset value, and/or the at least two of the first to N-th row parameters each are greater than or equal to the sixth preset value.

In some implementations, the filtering-determining unit 915 is specifically configured to determine to filter the boundary to-be-filtered when the transformation rate is less than the third preset value and a sum of any two of the first to N-th row parameters is less than a seventh preset value.

In some implementations, the filtering-determining unit 915 is specifically configured to determine not to filter the boundary to-be-filtered when the transformation rate is greater than or equal to the third preset value, and/or a sum of any two of the first to N-th row parameters is greater than or equal to an eighth preset value.

In a specific example, assuming that N=4 and the joint asymptotic feature includes the first row parameter and the fourth row parameter, the feature-determining unit 914 is specifically configured to determine the first row parameter according to a difference between a sample value of a distal sample and a sample value of a center sample in a first row of samples in the first boundary area, and determine the fourth row parameter according to a difference between a sample value of a distal sample and a sample value of a center sample in a fourth row of samples in the first boundary area.

For example, the center sample in the first row of samples includes: in the first row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the first row of samples includes: in the first row of samples, a third left sample adjacent to the second left sample and a third right sample adjacent to the second right sample.

The center sample in the fourth row of samples includes: in the fourth row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered. The distal sample in the fourth row of samples includes: in the fourth row of samples, a third left sample adjacent to the second left sample and a third right sample adjacent to the second right sample.

In this example, the feature-determining unit 914 is specifically configured to determine the first row parameter according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the first row of samples.

For example, the feature-determining unit 914 is specifically configured to determine the first row parameter according to the following formula:

$$dpq_0 = |2p_{2,0} - p_{1,0} - p_{0,0} + 2q_{2,0} - q_{1,0} - q_{0,0}|,$$

where $dpq_0$ represents the first row parameter, $p_{0,0}$ represents the first left sample in the first row of samples, $p_{1,0}$ represents the second left sample in the first row of samples, $p_{2,0}$ represents the third left sample in the first row of samples, $q_{0,0}$ represents the first right sample in the first row of samples, $q_{1,0}$ represents the second right sample in the first row of samples, $q_{2,0}$ represents the third right sample in the first row of samples.

Further, the feature-determining unit 914 is specifically configured to determine the fourth row parameter according to: a difference between a sample value of the third left sample and a sample value of the first left sample, a difference between the sample value of the third left sample and a sample value of the second left sample, a difference between a sample value of the third right sample and a sample value of the first right sample, and a difference between the sample value of the third right sample and a sample value of the second right sample in the fourth row of samples.

For example, the feature-determining unit 914 is specifically configured to determine the fourth row parameter according to the following formula:

$$dpq_3 = |2p_{2,3} - p_{1,3} - p_{0,3} + 2q_{2,3} - q_{1,3} - q_{0,3}|,$$

where $dpq_3$ represents the fourth row parameter, $p_{0,3}$ represents the first left sample in the fourth row of samples, $p_{1,3}$ represents the second left sample in the fourth row of samples, $p_{2,3}$ represents the third left sample in the fourth row of samples, $q_{0,3}$ represents the first right sample in the fourth row of samples, $q_{1,3}$ represents the second right sample in the fourth row of samples, $q_{2,3}$ represents the third right sample in the fourth row of samples.

Correspondingly, the filtering-determining unit 915 is specifically configured to:

determine not to filter the boundary to-be-filtered when the first row parameter and the fourth row parameter each are greater than or equal to the second preset value; or determine not to filter the boundary to-be-filtered when a sum of the first row parameter and the fourth row parameter is greater than or equal to the fourth preset value; or determine a transformation rate of the sample values of samples at two sides of the boundary to-be-filtered according to the sample values of samples at two sides of the boundary to-be-filtered, and determine whether to filter the boundary to-be-filtered according to the transformation rate and at least one of the first row parameter and the fourth row parameter.

For example, determine to filter the boundary to-be-filtered when the transformation rate is less than the third preset value, and the first row parameter and/or the fourth row parameter each are less than the fifth preset value.

For example, determine to filter the boundary to-be-filtered when the transformation rate is less than the third preset value, and the first row parameter and the fourth row parameter each are greater than or equal to the sixth preset value.

For example, determine to filter the boundary to-be-filtered when the transformation rate is less than the third preset value, and a sum of the first row parameter and the fourth row parameter is less than the seventh preset value.

For example, determine to filter the boundary to-be-filtered when the transformation rate is less than the third preset value, and the sum of the first row parameter and the fourth row parameter is greater than or equal to the eighth preset value.

When the boundary to-be-filtered is a horizontal boundary, the first picture block and the second picture block form a second boundary area containing M columns of samples. The feature-determining unit 914 is specifically configured to determine a j-th column parameter according to a difference between a sample value of a distal sample and a sample value of a center sample in a j-th column of samples in the second boundary area, and determine at least one of the first to M-th column parameters as the joint asymptotic feature, where M is a positive integer and j is an integer greater than or equal to 1 and less than M.

In some implementations, the center sample in the j-th column of samples includes: in the j-th column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered.

The distal sample in the j-th column of samples includes: in the j-th column of samples, a third top sample adjacent to the second top sample and a third bottom sample adjacent to the second bottom sample.

In some implementations, the feature-determining unit 914 is specifically configured to determine the j-th column parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the j-th column of samples.

For example, the feature-determining unit 914 is specifically configured to determining the j-th column parameter according to a formula:

$$dpq_j = |2p_{2,j} - p_{1,j} - p_{0,j} + 2q_{2,j} - q_{1,j} - q_{0,j}|,$$

where $dpq_j$ represents the j-th column parameter, $p_{0,j}$ represents the first top sample in the j-th column of samples, $p_{1,j}$ represents the second top sample in the j-th column of samples, $p_{2,j}$ represents the third top sample in the j-th column of samples, $q_{0,j}$ represents the first bottom sample in the j-th column of samples, $q_{1,j}$ represents the second bottom sample in the j-th column of samples, $q_{2,j}$ represents the third bottom sample in the j-th column of samples.

In some implementations, the filtering-determining unit 915 is specifically configured to determine not to filter the boundary to-be-filtered when the at least two of the first to M-th column parameters each are greater than or equal to a second preset value.

Optionally, the second preset value is greater than 0.5 and less than 1.

Optionally, the second preset value is greater than 0.5 and less than 0.8.

Optionally, the second preset value is half of a third preset value.

Optionally, the filtering-determining unit 915 is specifically configured to determine the second preset value according to a quantization parameter (QP).

In some implementations, the filtering-determining unit 915 is specifically configured to determine not to filter the boundary to-be-filtered when a sum of any two of the first to M-th column parameters is greater than or equal to a fourth preset value.

In some implementations, the filtering-determining unit 915 is specifically configured to determine a transformation rate of sample values of samples at two sides of the boundary to-be-filtered according to the sample values of samples at two sides of the boundary to-be-filtered, and determine whether to filter the boundary to-be-filtered according to the transformation rate and at least one of the first to M-th column parameters.

In some implementations, the filtering-determining unit 915 is specifically configured to determine to filter the boundary to-be-filtered when the transformation rate is less than a third preset value and the at least one of the first to M-th column parameters is less than a fifth preset value.

In some implementations, the filtering-determining unit 915 is specifically configured to determine not to filter the boundary to-be-filtered when the transformation rate is greater than or equal to a third preset value, and/or the at least two of the first to M-th column parameters each are greater than or equal to a sixth preset value.

In some implementations, the filtering-determining unit 915 is specifically configured to determine to filter the boundary to-be-filtered when the transformation rate is less than a third preset value and a sum of any two of the first to M-th column parameters is less than a seventh preset value.

In some implementations, the filtering-determining unit 915 is specifically configured to determine not to filter the boundary to-be-filtered when the transformation rate is greater than or equal to a third preset value, and/or a sum of any two of the first to M-th column parameters is greater than or equal to an eighth preset value.

Optionally, the joint asymptotic feature includes the first column parameter and the fourth column parameter In a specific example, assuming that M=4 and the joint asymptotic feature includes the first column parameter and the fourth column parameter, the feature-determining unit 914 is specifically configured to determine the first column parameter according to a difference between a sample value of a distal sample and a sample value of a center sample in a first column of samples in the second boundary area, and determine the fourth column parameter according to a difference between a sample value of a distal sample and a sample value of a center sample in a fourth column of samples in the second boundary area.

For example, the center sample in the first column of samples includes: in the first column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the first column of samples includes: in the first column of samples, a third top sample adjacent to the second top sample and a third bottom sample adjacent to the second bottom sample.

The center sample in the fourth column of samples includes: in the fourth column of samples, a first top sample adjacent to the boundary to-be-filtered and a second top sample adjacent to the first top sample on the top of the boundary to-be-filtered, and a first bottom sample adjacent to the boundary to-be-filtered and a second bottom sample adjacent to the first bottom sample on the bottom of the boundary to-be-filtered. The distal sample in the fourth column of samples includes: in the fourth column of samples, a third top sample adjacent to the second top sample and a third bottom sample adjacent to the second bottom sample.

In this case, the feature-determining unit 914 is specifically configured to determine the first column parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the first column of samples.

For example, the feature-determining unit 914 is specifically configured to determine the first column parameter according to a formula:

$$dpq_0=|2p_{2,0}-p_{1,0}-p_{0,0}+2q_{2,0}-q_{1,0}-q_{0,0}|,$$

where $dpq_0$ represents the first column parameter, $p_{0,0}$ represents the first top sample in the first column of samples, $p_{1,0}$ represents the second top sample in the first column of samples, $p_{2,0}$ represents the third top sample in the first column of samples, $q_{0,0}$ represents the first bottom sample in the first column of samples, $q_{1,0}$ represents the second bottom sample in the first column of samples, $q_{2,0}$ represents the third bottom sample in the first column of samples.

Further, the feature-determining unit 914 is specifically configured to determine the fourth column parameter according to: a difference between a sample value of the third top sample and a sample value of the first top sample, a difference between the sample value of the third top sample and a sample value of the second top sample, a difference between a sample value of the third bottom sample and a sample value of the first bottom sample, and a difference between the sample value of the third bottom sample and a sample value of the second bottom sample in the fourth column of samples.

For example, the feature-determining unit 914 is specifically configured to determine the fourth column parameter according to a formula:

$$dpq_3=|2p_{2,3}-p_{1,3}-p_{0,3}+2q_{2,3}-q_{1,3}-q_{0,3}|,$$

where $dpq_3$ represents the fourth column parameter, $p_{0,3}$ represents the first top sample in the fourth column of samples, $p_{1,3}$ represents the second top sample in the fourth column of samples, $p_{2,3}$ represents the third top sample in the fourth column of samples, $q_{0,3}$ represents the first bottom sample in the fourth column of samples, $q_{1,3}$ represents the second bottom sample in the fourth column of samples, $q_{2,3}$ represents the third bottom sample in the fourth column of samples.

Correspondingly, the filtering-determining unit 915 is specifically configured to:
  determine not to filter the boundary to-be-filtered when the first column parameter and the fourth column parameter each are greater than or equal to a second preset value; or
  determine not to filter the boundary to-be-filtered when a sum of the first column parameter and the fourth column parameter is greater than or equal to a fourth preset value; or
  determine a transformation rate of sample values of samples at two sides of the boundary to-be-filtered according to the sample values of samples at two sides of the boundary to-be-filtered, and determine whether to filter the boundary to-be-filtered according to the transformation rate and at least one of the first column parameter and the fourth column parameter.

For example, determine to filter the boundary to-be-filtered when the transformation rate is less than a third preset value, and the first column parameter and/or the fourth column parameter each are less than a fifth preset value.

For example, determine to filter the boundary to-be-filtered when the transformation rate is less than a third preset value, and the first column parameter and the fourth column parameter each are greater than or equal to a sixth preset value.

For example, determine to filter the boundary to-be-filtered when the transformation rate is less than a third preset value, and a sum of the first column parameter and the fourth column parameter is less than a seventh preset value.

For example, determine to filter the boundary to-be-filtered when the transformation rate is less than a third preset value, and a sum of the first column parameter and the fourth column parameter is greater than or equal to an eighth preset value.

It should be noted that the device implementations may be corresponding to the method implementations, and similar descriptions made be made to the method implementations, which will be repeated herein. Specifically, the video decoder 900 illustrated in FIG. 11 may perform the method in implementations of the disclosure. The aforementioned and other operations and/or functions of each unit in the video decoder 900 are respectively intended to implement corresponding processes in each method such as method 600 or 700, and for the sake of brevity, details are not repeated here.

The devices and systems of the implementations of the present disclosure are described above from the perspective of functional units with reference to the accompanying drawings. It should be understood that the functional units may be implemented in the form of hardware, may also be implemented by instructions in the form of software, and may also be implemented by a combination of hardware and software units. Specifically, each operation of the method implementations in the disclosure can be implemented by an integrated logic circuit of the hardware in the processor and/or instructions in the form of software, and the operations of the method disclosed in implementations of the disclosure can be directly executed by a hardware coding processor or a combination of hardware and software units in the decoding processor. Optionally, the software unit may be located in a mature storage medium in the field such as random access memory, flash memory, read-only memory, programmable read-only memory, electrically erasable programmable memory, and registers. The storage medium is located in the memory, and the processor reads the information from the memory, and completes the steps in the above method implementations in combination with its hardware.

Figure 12:
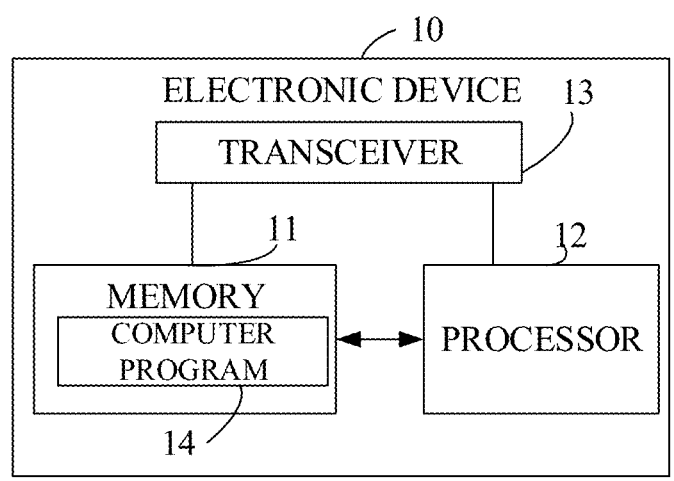
FIG. 12 is a schematic block diagram of an electronic device 10 provided in implementations of the disclosure.

FIG. 12 is a schematic block diagram of an electronic device 10 provided in implementations of the present disclosure.

As illustrated in FIG. 12, the electronic device 10 may be the video encoder or video decoder described in implementations of the present disclosure. The electronic device 10 may include a memory 11 and a processor 12.

The memory 11 is configured to store a computer program 14 and transmit the program code 14 to the processor 12. In other words, the processor 12 can call and run the computer program 14 from the memory 11 to implement the method in implementations of the present disclosure.

For example, the processor 12 can be used to execute the operations in the above-mentioned method 200 according to the instructions in the computer program 34.

In some implementations of the present disclosure, the processor 12 may include, but is not limited to: general-purpose processor, digital signal processor (DSP), disclosure specific integrated circuit (ASIC), field programmable gate array (FPGA) or other programmable logic devices, discrete gates or transistor logic devices, discrete hardware components, and so on.

In some implementations of the present disclosure, the memory 11 includes but is not limited to: volatile memory and/or non-volatile memory. The non-volatile memory can be read-only memory (ROM), programmable read-only memory (PROM), erasable programmable read-only memory (EPROM), electrically programmable Erase Programmable Read-Only Memory (EEPROM) or Flash. The volatile memory may be Random Access Memory (RAM), which acts as an external cache. By way of illustration and not limitation, many forms of RAM are available such as Static RAM (SRAM), Dynamic RAM (DRAM), Synchronous DRAM (Synchronous DRAM, SDRAM), double data rate synchronous dynamic random access memory (Double Data Rate SDRAM, DDR SDRAM), enhanced synchronous dynamic random access memory (Enhanced SDRAM, ESDRAM), synchronous connection dynamic random access memory (synch link DRAM, SLDRAM) and Direct Memory Bus Random Access Memory (Direct Rambus RAM, DR RAM).

In some implementations of the present disclosure, the computer program 14 can be divided into one or more units, and the one or more units are stored in the memory 11 and executed by the processor 12 to complete the methods in the present disclosure. The one or more units may be a series of computer program instruction segments capable of accomplishing specific functions, and the instruction segments are used to describe the execution process of the computer program 14 in the electronic device 10.

As illustrated in FIG. 12, the electronic device 10 may also include: a transceiver 13, where the transceiver 13 may be connected to the processor 12 or the memory 11.

The processor 12 can control the transceiver 13 to communicate with other devices, specifically, to send information or data to other devices, or receive information or data sent by other devices. The transceiver 13 may include a transmitter and a receiver. The transceiver 13 may further include antennas, and the number of antennas may be one or more.

It should be understood that the various components in the electronic device 10 are connected through a bus system, where the bus system includes not only a data bus, but also a power bus, a control bus and a status signal bus.

Figure 13:
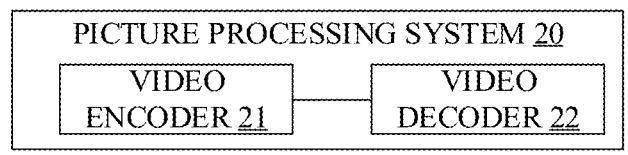
FIG. 13 is a schematic block diagram of a picture processing system 20 provided in implementations of the disclosure.

FIG. 13 is a schematic block diagram of a picture processing coding system 40 provided in implementation of the present disclosure.

As illustrated in FIG. 13, the picture processing system 20 may include a video encoder 21 and a video decoder 22, where the video encoder 21 is used to execute the video encoding method involved in implementations of the present disclosure, and the video decoder 22 is used to execute the video decoding method involved in implementations of the present disclosure.

The present disclosure also provides a computer storage medium, on which a computer program is stored, and when the computer program is executed by a computer, the computer can execute the methods of the above method implementations. In other words, the implementations of the present disclosure further provide a computer program product including instructions, and when the instructions are executed by a computer, the computer executes the methods of the foregoing method implementations.

When implemented using software, the disclosure may be implemented in whole or in part in the form of a computer program product. The computer program product includes one or more computer instructions. When the computer program instructions are loaded and executed on the computer, the processes or functions according to the implementations of the present disclosure will be generated in whole or in part. The computer can be a general purpose computer, a special purpose computer, a computer network, or other programmable device. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a digital video disc (DVD)), or a semiconductor medium (such as a solid state disk (SSD)), etc.

Those skilled in the art can appreciate that the units and algorithm steps of the examples described in conjunction with the implementations disclosed herein can be implemented by electronic hardware, or a combination of computer software and electronic hardware. Whether these functions are executed by hardware or software depends on the specific disclosure and design constraints of the technical solution. Those skilled in the art may use different methods to implement the described functions for each specific disclosure, but such implementation should not be regarded as exceeding the scope of the present disclosure.

In the several implementations provided in this disclosure, it should be understood that the disclosed systems, apparatuses, and methods may be implemented in other ways. For example, the apparatus implementations described above are only illustrative. For example, the division of the units is only a logical function division. In actual implementation, there may be other division methods. For example, multiple units or components can be combined or can be integrated into another system, or some features may be ignored, or not implemented. In another point, the mutual coupling or direct coupling or communication connection illustrated or discussed may be through some interfaces, and the indirect coupling or communication connection of devices or units may be in electrical, mechanical or other forms.

Units described as separate components may or may not be physically separated, and a component displayed as a unit may or may not be a physical unit, that is, it may be located in one place, or may be distributed to multiple network units. Part or all of the units can be selected according to actual needs to achieve the purpose of the solution of this implementation. For example, each functional unit in each implementation of the present disclosure may be integrated into one processing unit, each unit may exist separately physically, or two or more units may be integrated into one unit.

The above is only a specific implementation of the disclosure, but the scope of protection of the disclosure is not limited thereto. Those skilled in the art can easily think of changes or substitutions within the technical scope disclosed in the disclosure, which should be covered within the scope of protection of this disclosure. Therefore, the protection scope of the present disclosure should be based on the protection scope of the claims.

What is claimed is:

1. A picture processing method, applied to a video encoder and comprising:
   obtaining a partial or complete reconstructed picture of a picture to-be-encoded, the partial or complete reconstructed picture containing one or more reconstructed picture blocks;
   determining a boundary to-be-filtered of the reconstructed picture block;
   determining a boundary filtering strength of the boundary to-be-filtered according to encoding information of a first picture block and a second picture block which are adjacent to the boundary to-be-filtered on two sides of the boundary to-be-filtered respectively;
   determining a joint asymptotic feature of the boundary to-be-filtered according to sample values of samples at two sides of the boundary to-be-filtered when the boundary filtering strength of the boundary to-be-filtered is greater than a first preset value; and
   determining whether to filter the boundary to-be-filtered according to the joint asymptotic feature of the boundary to-be-filtered;
   wherein determining the joint asymptotic feature of the boundary to-be-filtered according to the sample values of the samples at two sides of the boundary to-be-filtered comprises:
      determining the joint asymptotic feature of the boundary to-be-filtered according to a difference between a sample value of a center sample and a sample value of a distal sample in the samples at two sides of the boundary to-be-filtered, wherein the center sample is adjacent to the boundary to-be-filtered, and the distal sample is adjacent to the center sample;
   wherein determining the joint asymptotic feature of the boundary to-be-filtered according to the difference between the sample value of the center sample and the sample value of the distal sample in the samples at two sides of the boundary to-be-filtered comprises:
   when the boundary to-be-filtered is a vertical boundary, and the first picture block and the second picture block form a first boundary area containing N rows of samples:
      determining an i-th row parameter according to a difference between a sample value of a distal sample and a sample value of a center sample in an i-th row of samples in the first boundary area; and
      determining at least one of the first to N-th row parameters as the joint asymptotic feature, wherein N is a positive integer and i is an integer greater than or equal to 1 and less than N; and
   when the boundary to-be-filtered is a horizontal boundary, and the first picture block and the second picture block form a second boundary area containing M columns of samples:
      determining a j-th column parameter according to a difference between a sample value of a distal sample and a sample value of a center sample in a j-th column of samples in the second boundary area; and
      determining at least one of the first to M-th column parameters as the joint asymptotic feature, wherein M is a positive integer and j is an integer greater than or equal to 1 and less than M.

2. The method of claim 1, wherein when the joint asymptotic feature of the boundary to-be-filtered comprises at least two of the first to N-th row parameters, determining whether to filter the boundary to-be-filtered according to the joint asymptotic feature of the boundary to-be-filtered comprises:
   determining not to filter the boundary to-be-filtered when the at least two parameters of the first to N-th row parameters each are greater than or equal to a second preset value; or
   determining not to filter the boundary to-be-filtered when a sum of any two of the first to N-th row parameters is greater than or equal to a fourth preset value.

3. The method of claim 1, wherein determining whether to filter the boundary to-be-filtered according to the joint asymptotic feature of the boundary to-be-filtered comprises:
   determining a transformation rate of sample values of samples at two sides of the boundary to-be-filtered according to the sample values of samples at two sides of the boundary to-be-filtered; and
   determining whether to filter the boundary to-be-filtered according to the transformation rate and at least one of the first to N-th row parameters.

4. The method of claim 1, wherein N=4, the joint asymptotic feature comprises the first row parameter and a fourth row parameter, and determining the joint asymptotic feature of the boundary to-be-filtered according to the difference between the sample value of the center sample and the sample value of the distal sample in the samples at two sides of the boundary to-be-filtered comprises:
   determining the first row parameter according to a difference between a sample value of a distal sample and a sample value of a center sample in a first row of samples in the first boundary area; and
   determining the fourth row parameter according to a difference between a sample value of a distal sample and a sample value of a center sample in a fourth row of samples in the first boundary area.

5. The method of claim 1, wherein when the joint asymptotic feature of the boundary to-be-filtered comprises at least two of the first to M-th column parameters, determining whether to filter the boundary to-be-filtered according to the joint asymptotic feature of the boundary to-be-filtered comprises:
   determining not to filter the boundary to-be-filtered when the at least two of the first to M-th column parameters each are greater than or equal to a second preset value; or
   determining not to filter the boundary to-be-filtered when a sum of any two of the first to M-th column parameters is greater than or equal to a fourth preset value.

6. The method of claim 1, wherein determining whether to filter the boundary to-be-filtered according to the joint asymptotic feature of the boundary to-be-filtered comprises:
   determining a transformation rate of sample values of samples at two sides of the boundary to-be-filtered according to the sample values of samples at two sides of the boundary to-be-filtered; and
   determining whether to filter the boundary to-be-filtered according to the transformation rate and at least one of the first to M-th column parameters.

7. The method of claim 1, wherein M=4, the joint asymptotic feature comprises the first column parameter and the fourth column parameter, and determining the joint asymptotic feature of the boundary to-be-filtered according to the difference between the sample value of the center sample and the sample value of the distal sample in the samples at two sides of the boundary to-be-filtered comprises:

determining the first column parameter according to a difference between a sample value of a distal sample and a sample value of a center sample in a first column of samples in the second boundary area; and determining the fourth column parameter according to a difference between a sample value of a distal sample and a sample value of a center sample in a fourth column of samples in the second boundary area.

8. A picture processing method, applied to a decoder, the method comprising:

parsing a bitstream to determine a partial or complete reconstructed picture, the partial or complete reconstructed picture containing one or more reconstructed picture blocks;

determining a boundary to-be-filtered of the reconstructed picture block;

determining a boundary filtering strength of the boundary to-be-filtered according to encoding information of a first picture block and a second picture block which are adjacent to the boundary to-be-filtered on two sides of the boundary to-be-filtered respectively;

determining a joint asymptotic feature of the boundary to-be-filtered according to sample values of samples at two sides of the boundary to-be-filtered when the boundary filtering strength of the boundary to-be-filtered is greater than a first preset value; and determining whether to filter the boundary to-be-filtered according to the joint asymptotic feature of the boundary to-be-filtered;

wherein determining the joint asymptotic feature of the boundary to-be-filtered according to the sample values of the samples at two sides of the boundary to-be-filtered comprises:

determining the joint asymptotic feature of the boundary to-be-filtered according to a difference between a sample value of a center sample and a sample value of a distal sample in the samples at two sides of the boundary to-be-filtered, wherein the center sample is adjacent to the boundary to-be-filtered, and the distal sample is adjacent to the center sample;

wherein determining the joint asymptotic feature of the boundary to-be-filtered according to the difference between the sample value of the center sample and the sample value of the distal sample in the samples at two sides of the boundary to-be-filtered comprises:

when the boundary to-be-filtered is a vertical boundary, and the first picture block and the second picture block form a first boundary area containing N rows of samples:

determining an i-th row parameter according to a difference between a sample value of a distal sample and a sample value of a center sample in an i-th row of samples in the first boundary area; and determining at least one of the first to N-th row parameters as the joint asymptotic feature, wherein N is a positive integer and i is an integer greater than or equal to 1 and less than N; and when the boundary to-be-filtered is a horizontal boundary, and the first picture block and the second picture block form a second boundary area containing M columns of samples:

determining a j-th column parameter according to a difference between a sample value of a distal sample and a sample value of a center sample in a j-th column of samples in the second boundary area; and determining at least one of the first to M-th column parameters as the joint asymptotic feature, wherein M is a positive integer and i is an integer greater than or equal to 1 and less than M.

9. The method of claim 8, wherein the center sample in the i-th row of samples comprises: in the i-th row of samples, a first left sample adjacent to the boundary to-be-filtered and a second left sample adjacent to the first left sample on the left side of the boundary to-be-filtered, and a first right sample adjacent to the boundary to-be-filtered and a second right sample adjacent to the first right sample on the right side of the boundary to-be-filtered; and the distal sample in the i-th row of samples comprises: in the i-th row of samples, a third left sample adjacent to the second left sample and a third right sample adjacent to the second right sample.

10. The method of claim 8, wherein when the joint asymptotic feature of the boundary to-be-filtered comprises at least two of the first to N-th row parameters, determining whether to filter the boundary to-be-filtered according to the joint asymptotic feature of the boundary to-be-filtered comprises:

determining not to filter the boundary to-be-filtered when the at least two parameters of the first to N-th row parameters each are greater than or equal to a second preset value; or determining not to filter the boundary to-be-filtered when a sum of any two of the first to N-th row parameters is greater than or equal to a fourth preset value.

11. The method of claim 8, wherein determining whether to filter the boundary to-be-filtered according to the joint asymptotic feature of the boundary to-be-filtered comprises:

determining a transformation rate of sample values of samples at two sides of the boundary to-be-filtered according to the sample values of samples at two sides of the boundary to-be-filtered; and determining whether to filter the boundary to-be-filtered according to the transformation rate and at least one of the first to N-th row parameters.

12. The method of claim 8, wherein N=4, the joint asymptotic feature comprises the first row parameter and the fourth row parameter, and determining the joint asymptotic feature of the boundary to-be-filtered according to the difference between the sample value of the center sample and the sample value of the distal sample in the samples at two sides of the boundary to-be-filtered comprises:

determining the first row parameter according to a difference between a sample value of a distal sample and a sample value of a center sample in a first row of samples in the first boundary area; and determining the fourth row parameter according to a difference between a sample value of a distal sample and a sample value of a center sample in a fourth row of samples in the first boundary area.

13. The method of claim 8, wherein when the joint asymptotic feature of the boundary to-be-filtered comprises at least two of the first to M-th column parameters, determining whether to filter the boundary to-be-filtered according to the joint asymptotic feature of the boundary to-be-filtered comprises:

determining not to filter the boundary to-be-filtered when the at least two of the first to M-th column parameters each are greater than or equal to a second preset value; or determining not to filter the boundary to-be-filtered when a sum of any two of the first to M-th column parameters is greater than or equal to a fourth preset value.

14. The method of claim 8, wherein determining whether to filter the boundary to-be-filtered according to the joint asymptotic feature of the boundary to-be-filtered comprises:
   determining a transformation rate of sample values of samples at two sides of the boundary to-be-filtered according to the sample values of samples at two sides of the boundary to-be-filtered; and
   determining whether to filter the boundary to-be-filtered according to the transformation rate and at least one of the first to M-th column parameters.

15. The method of claim 8, wherein M=4, the joint asymptotic feature comprises the first column parameter and the fourth column parameter, and determining the joint asymptotic feature of the boundary to-be-filtered according to the difference between the sample value of the center sample and the sample value of the distal sample in the samples at two sides of the boundary to-be-filtered comprises:
   determining the first column parameter according to a difference between a sample value of a distal sample and a sample value of a center sample in a first column of samples in the second boundary area; and
   determining the fourth column parameter according to a difference between a sample value of a distal sample and a sample value of a center sample in a fourth column of samples in the second boundary area.

16. A video decoder, comprising:
   a processor; and
   a memory configured to store a computer program which, when executed by the processor, causes the processor to:
      parse a bitstream to determine a partial or complete reconstructed picture, the partial or complete reconstructed picture containing one or more reconstructed picture blocks;
      determine a boundary to-be-filtered of the reconstructed picture block;
      determine a boundary filtering boundary of the boundary to-be-filtered according to encoding information of a first picture block and a second picture block which are adjacent to the boundary to-be-filtered on two sides of the boundary to-be-filtered respectively;
      determine a joint asymptotic feature of the boundary to-be-filtered according to sample values of samples at two sides of the boundary to-be-filtered when the boundary filtering strength of the boundary to-be-filtered is greater than a first preset value; and
      determine whether to filter the boundary to-be-filtered according to the joint asymptotic feature of the boundary to-be-filtered;
   wherein in terms of determining the joint asymptotic feature of the boundary to-be-filtered according to the sample values of the samples at two sides of the boundary to-be-filtered, the computer program, when executed by the processor, causes the processor to:
      determine the joint asymptotic feature of the boundary to-be-filtered according to a difference between a sample value of a center sample and a sample value of a distal sample in the samples at two sides of the boundary to-be-filtered, wherein the center sample is adjacent to the boundary to-be-filtered, and the distal sample is adjacent to the center sample;
   wherein in terms of determining the joint asymptotic feature of the boundary to-be-filtered according to the difference between the sample value of the center sample and the sample value of the distal sample in the samples at two sides of the boundary to-be-filtered, the computer program, when executed by the processor, causes the processor to:
   when the boundary to-be-filtered is a vertical boundary, and the first picture block and the second picture block form a first boundary area containing N rows of samples:
      determine an i-th row parameter according to a difference between a sample value of a distal sample and a sample value of a center sample in an i-th row of samples in the first boundary area; and
      determine at least one of the first to N-th row parameters as the joint asymptotic feature, wherein N is a positive integer and i is an integer greater than or equal to 1 and less than N; and
   when the boundary to-be-filtered is a horizontal boundary, and the first picture block and the second picture block form a second boundary area containing M columns of samples:
      determine a j-th column parameter according to a difference between a sample value of a distal sample and a sample value of a center sample in a j-th column of samples in the second boundary area; and
      determine at least one of the first to M-th column parameters as the joint asymptotic feature, wherein M is a positive integer and i is an integer greater than or equal to 1 and less than M.

* * * * *